United States Patent
Doumani et al.

(10) Patent No.: US 9,868,167 B2
(45) Date of Patent: Jan. 16, 2018

(54) POWER TOOL WITH DROP ARM ORBIT BRACKET

(71) Applicants: Robert Bosch Tool Corporation, Broadview, IL (US); Robert Bosch GmbH, Stuttgart (DE)

(72) Inventors: Robert S. Doumani, Hoffman Estates, IL (US); Eric Laliberte, Naperville, IL (US); Timothy Szweda, Chicago, IL (US); Brian Taylor, Elmhurst, IL (US)

(73) Assignees: Robert Bosch Tool Corporation, Broadview, IL (US); Robert Bosch GmbH, Stuttgart (DE)

( * ) Notice: Subject to any disclaimer, the term of this patent is extended or adjusted under 35 U.S.C. 154(b) by 144 days.

(21) Appl. No.: 15/060,796

(22) Filed: Mar. 4, 2016

(65) Prior Publication Data
US 2016/0263683 A1 Sep. 15, 2016

Related U.S. Application Data

(60) Provisional application No. 62/131,977, filed on Mar. 12, 2015, provisional application No. 62/132,004, filed on Mar. 12, 2015.

(51) Int. Cl.
*B23D 45/06* (2006.01)
*B23D 59/00* (2006.01)
(Continued)

(52) U.S. Cl.
CPC ......... *B23D 59/002* (2013.01); *B23D 45/067* (2013.01); *B23D 47/08* (2013.01); *B27G 19/02* (2013.01)

(58) Field of Classification Search
CPC ..... B23D 59/002; B23D 45/067; B23D 47/08
(Continued)

(56) References Cited

U.S. PATENT DOCUMENTS 2,719,547 A * 10/1955 Gjerde .................... B27B 5/182
                                                  83/468.3
3,908,139 A * 9/1975 Duncan, Jr. ........... B23B 45/001
                                                  173/217

(Continued)

FOREIGN PATENT DOCUMENTS

DE        20007037        7/2000
DE     202004012468      11/2004

*Primary Examiner* — Sean Michalski
(74) *Attorney, Agent, or Firm* — Maginot, Moore & Beck LLP

(57) ABSTRACT

A power tool assembly includes a drop arm assembly including a drop arm frame and an arbor shaft configured to support a shaping device at least partially above a workpiece support surface, the drop arm assembly configured to move within a drop plane to drop the shaping device completely beneath the workpiece support surface, a belt operably connected to the arbor shaft and configured to rotate the arbor shaft through a slave pulley, the slave pulley having a slave pulley axis of rotation, a motor including a power shaft operably connected to the belt through a motor end pulley, the motor end pulley having a motor end pulley axis of rotation, and an orbit bracket configured to orbitally support the drop arm assembly, the orbit bracket defining a drop arm orbit axis located between the motor end pulley axis of rotation and the slave pulley axis of rotation.

20 Claims, 23 Drawing Sheets

(51) Int. Cl.
*B23D 47/08* (2006.01)
*B27G 19/02* (2006.01)

(58) Field of Classification Search
USPC .................................................. 83/477.2
See application file for complete search history.

(56) References Cited

U.S. PATENT DOCUMENTS

| | | | |
|---|---|---|---|
| 4,161,272 A | 7/1979 | Brockl | |
| 4,616,447 A | 10/1986 | Haas et al. | |
| 4,631,433 A * | 12/1986 | Stokes | H02K 5/08 310/43 |
| 5,006,740 A * | 4/1991 | Palm | B23Q 11/005 310/43 |
| 5,268,607 A * | 12/1993 | McManus | F16C 35/02 310/43 |
| 5,676,319 A | 10/1997 | Stiggins et al. | |
| 5,734,214 A * | 3/1998 | Gilliland | F04D 25/06 310/194 |
| 5,747,903 A * | 5/1998 | Klingler | H02K 7/081 310/43 |
| 6,536,536 B1 | 3/2003 | Gass et al. | |
| 6,573,625 B2 * | 6/2003 | Shimizu | H02K 5/10 310/239 |
| 6,813,983 B2 | 11/2004 | Gass et al. | |
| 6,826,988 B2 | 12/2004 | Gass et al. | |
| 6,834,730 B2 | 12/2004 | Gass et al. | |
| 6,838,790 B2 * | 1/2005 | Arimitsu | H02K 1/08 310/114 |
| 6,857,345 B2 | 2/2005 | Gass et al. | |
| 6,870,296 B2 * | 3/2005 | Ho | H02K 9/06 310/233 |
| 6,877,410 B2 | 4/2005 | Gass et al. | |
| 6,880,440 B2 | 4/2005 | Gass et al. | |
| 6,920,814 B2 | 7/2005 | Gass et al. | |
| 6,922,153 B2 * | 7/2005 | Pierga | B23D 45/067 318/16 |
| 6,945,148 B2 | 9/2005 | Gass et al. | |
| 6,945,149 B2 | 9/2005 | Gass et al. | |
| 6,957,601 B2 | 10/2005 | Gass et al. | |
| 6,994,004 B2 | 2/2006 | Gass et al. | |
| 6,997,090 B2 | 2/2006 | Gass et al. | |
| 7,000,514 B2 | 2/2006 | Gass et al. | |
| 7,024,975 B2 | 4/2006 | Gass et al. | |
| 7,029,384 B2 | 4/2006 | Steimel et al. | |
| 7,055,417 B1 | 6/2006 | Gass | |
| 7,077,039 B2 | 7/2006 | Gass et al. | |
| 7,093,668 B2 | 8/2006 | Gass et al. | |
| 7,098,800 B2 | 8/2006 | Gass | |
| 7,100,483 B2 | 9/2006 | Gass et al. | |
| 7,121,358 B2 | 10/2006 | Gass et al. | |
| 7,137,326 B2 | 11/2006 | Gass et al. | |
| 7,137,327 B2 * | 11/2006 | Garcia | B23D 45/067 83/102.1 |
| 7,171,879 B2 | 2/2007 | Gass et al. | |
| 7,197,969 B2 | 4/2007 | Gass et al. | |
| 7,210,383 B2 | 5/2007 | Gass et al. | |
| 7,225,712 B2 | 6/2007 | Gass et al. | |
| 7,228,772 B2 | 6/2007 | Gass | |
| 7,231,856 B2 | 6/2007 | Gass et al. | |
| 7,284,467 B2 | 10/2007 | Gass et al. | |
| 7,290,472 B2 | 11/2007 | Gass et al. | |
| 7,290,474 B2 * | 11/2007 | Keller | B23D 59/001 192/130 |
| 7,290,967 B2 | 11/2007 | Steimel et al. | |
| 7,308,843 B2 | 12/2007 | Gass et al. | |
| 7,328,752 B2 | 2/2008 | Gass et al. | |
| 7,347,131 B2 | 3/2008 | Gass | |
| 7,350,444 B2 * | 4/2008 | Gass | B23D 45/06 83/397.1 |
| 7,350,445 B2 | 4/2008 | Gass et al. | |
| 7,353,737 B2 | 4/2008 | Gass et al. | |
| 7,357,056 B2 | 4/2008 | Gass et al. | |
| 7,359,174 B2 | 4/2008 | Gass | |
| 7,373,863 B2 | 5/2008 | O'Banion et al. | |
| 7,377,199 B2 | 5/2008 | Gass et al. | |
| 7,421,315 B2 | 9/2008 | Gass et al. | |
| 7,459,817 B2 * | 12/2008 | VanLuik | H02K 1/32 310/216.004 |
| 7,472,634 B2 | 1/2009 | Gass et al. | |
| 7,475,542 B2 | 1/2009 | Borg et al. | |
| 7,481,140 B2 | 1/2009 | Gass et al. | |
| 7,509,899 B2 * | 3/2009 | Gass | B23D 47/08 83/397.1 |
| 7,525,055 B2 | 4/2009 | Gass et al. | |
| 7,536,238 B2 | 5/2009 | Gass | |
| 7,540,334 B2 | 6/2009 | Gass et al. | |
| 7,591,210 B2 | 9/2009 | Gass et al. | |
| 7,600,455 B2 * | 10/2009 | Gass | B23D 59/001 83/477.1 |
| 7,644,645 B2 * | 1/2010 | Gass | B23D 59/001 83/477.1 |
| 7,707,920 B2 * | 5/2010 | Gass | B23D 45/067 83/471.1 |
| 7,739,934 B2 | 6/2010 | Tetelbaum et al. | |
| 7,827,889 B2 | 11/2010 | Carrier | |
| 7,888,826 B1 | 2/2011 | Shafer et al. | |
| 8,186,256 B2 | 5/2012 | Carrier | |
| 8,186,258 B2 | 5/2012 | Chung | |
| 8,210,076 B2 * | 7/2012 | Oberheim | B27G 19/02 83/477.2 |
| 8,245,612 B2 | 8/2012 | Chung et al. | |
| 8,250,957 B2 | 8/2012 | Holmes et al. | |
| 8,272,305 B2 * | 9/2012 | Xu | B27B 5/243 83/102.1 |
| 8,286,537 B2 | 10/2012 | Fischer et al. | |
| 8,291,801 B2 | 10/2012 | Chung et al. | |
| 8,297,159 B2 | 10/2012 | Voruganti et al. | |
| 8,316,748 B2 | 11/2012 | Chung et al. | |
| 8,327,744 B2 * | 12/2012 | Groth | B23D 45/067 83/477.2 |
| 8,346,384 B2 * | 1/2013 | Murakami | B23D 59/001 700/177 |
| 8,648,016 B2 | 2/2014 | Kavusi et al. | |
| 8,726,773 B2 * | 5/2014 | Koegel | B23D 59/006 83/471.3 |
| 8,770,074 B2 * | 7/2014 | Frolov | B23D 59/006 144/252.1 |
| 8,919,231 B2 * | 12/2014 | Butler | B27B 5/222 83/397.1 |
| 9,079,258 B2 | 7/2015 | Chung | |
| 9,616,509 B2 * | 4/2017 | Liao | B23D 45/065 |
| 9,702,916 B2 * | 7/2017 | Ramaswamy | G01R 29/26 |
| 2004/0159198 A1 | 8/2004 | Peot et al. | |
| 2005/0081318 A1 * | 4/2005 | Boutilier | A47L 13/08 15/236.01 |
| 2006/0032355 A1 * | 2/2006 | Wang | B23D 45/067 83/471.1 |
| 2006/0201300 A1 * | 9/2006 | Schwaiger | B23D 45/068 83/473 |
| 2007/0074613 A1 * | 4/2007 | Yu | B23D 45/068 83/581 |
| 2007/0220758 A1 * | 9/2007 | Ho | B26B 5/001 30/162 |
| 2007/0227327 A1 * | 10/2007 | Liu | B23D 45/067 83/477.2 |
| 2009/0133553 A1 * | 5/2009 | Gass | B23D 47/08 83/62.1 |
| 2009/0158906 A1 * | 6/2009 | Shibata | B23D 47/04 83/477.2 |
| 2010/0024620 A1 * | 2/2010 | Arvey | B27G 19/00 83/397 |
| 2014/0090530 A1 | 4/2014 | Haldar et al. | |
| 2014/0090860 A1 | 4/2014 | Ramaswamy et al. | |
| 2017/0225351 A1 * | 8/2017 | Butler | B27B 5/38 |

\* cited by examiner

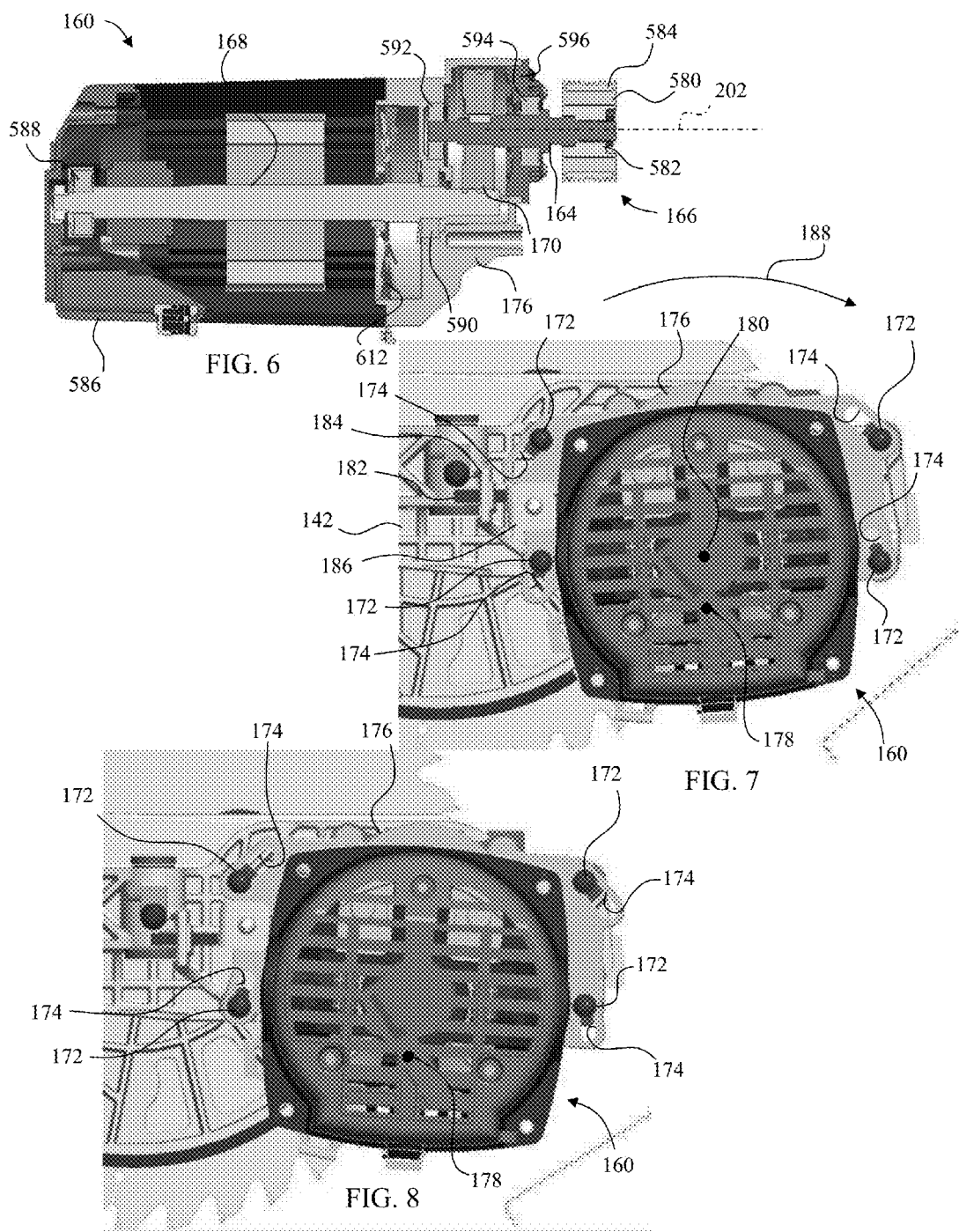

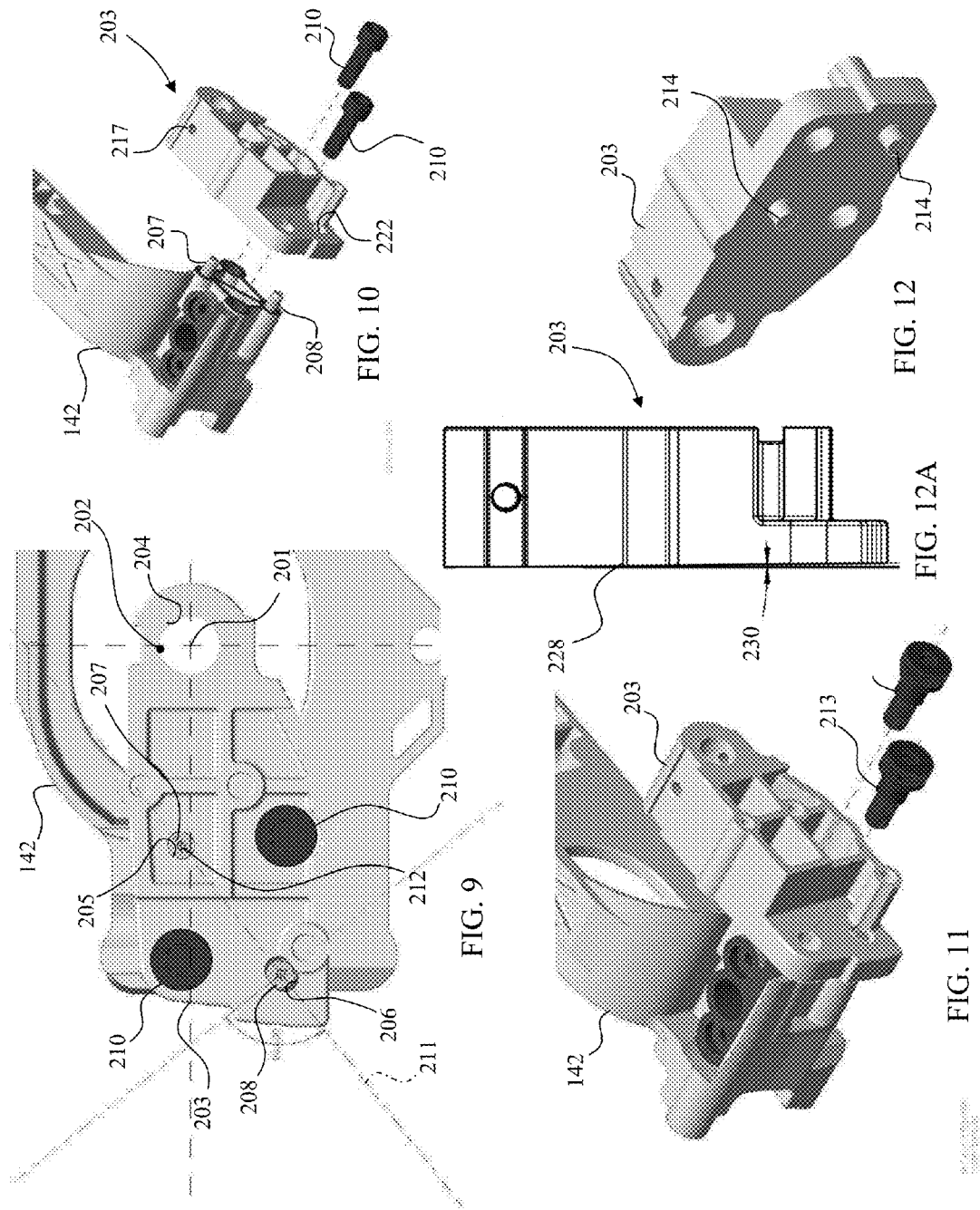

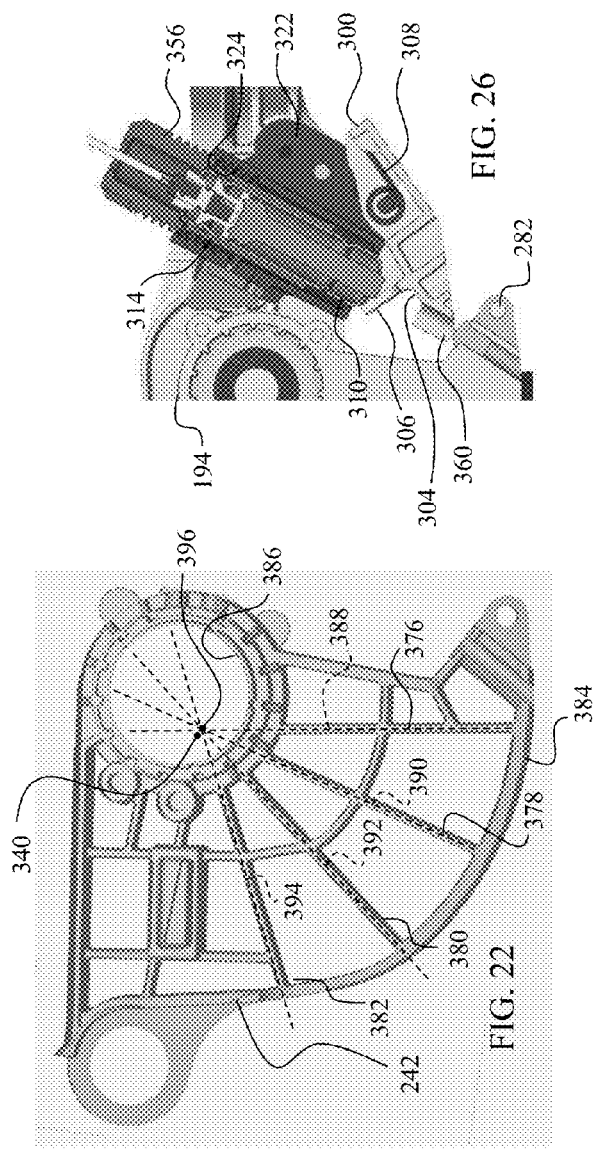
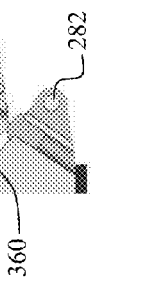
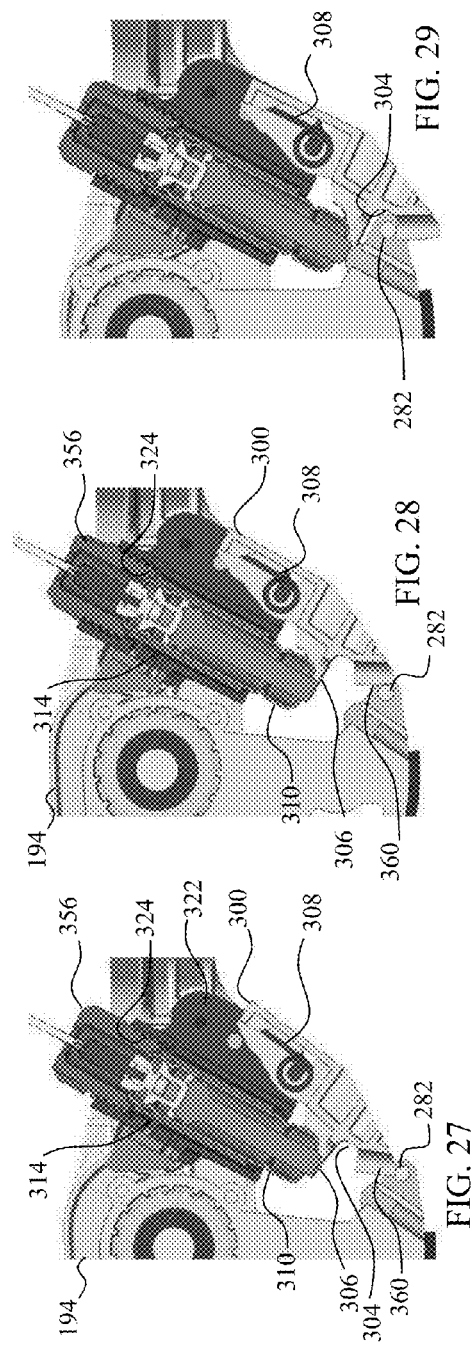

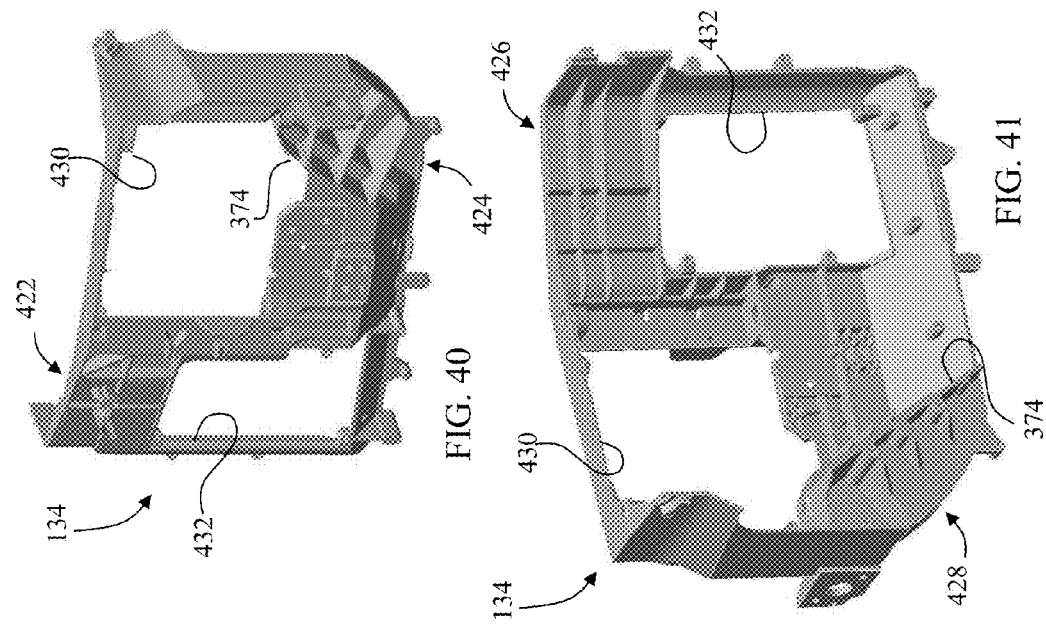
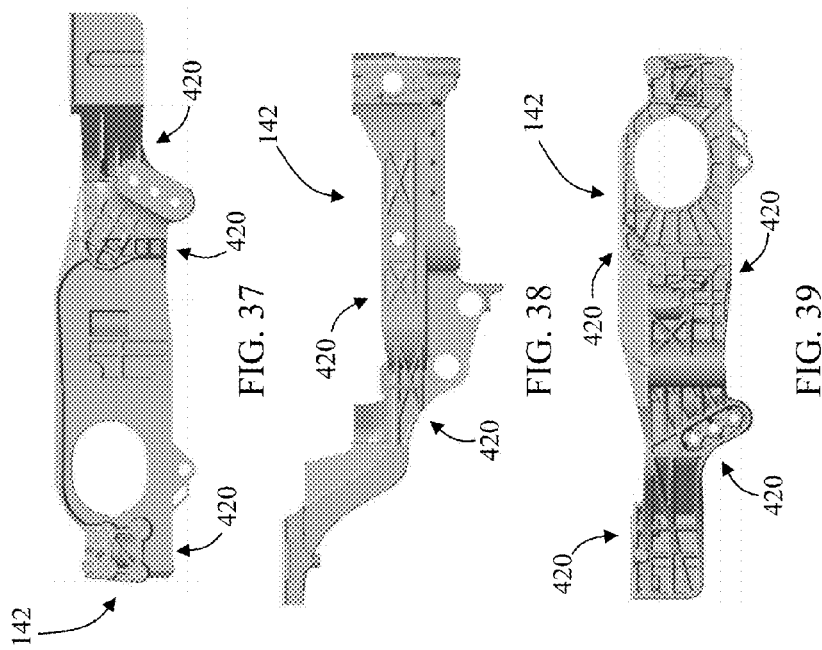

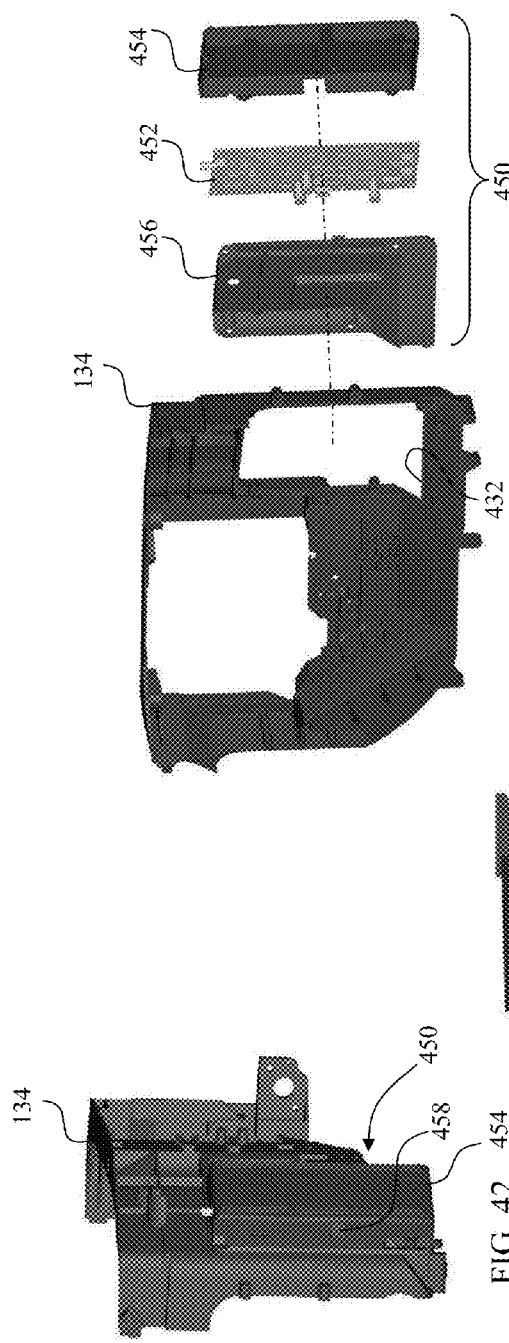

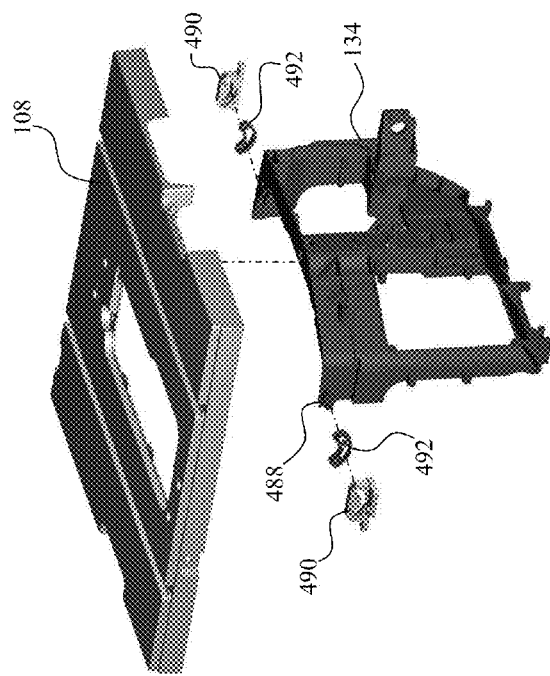
FIG. 52
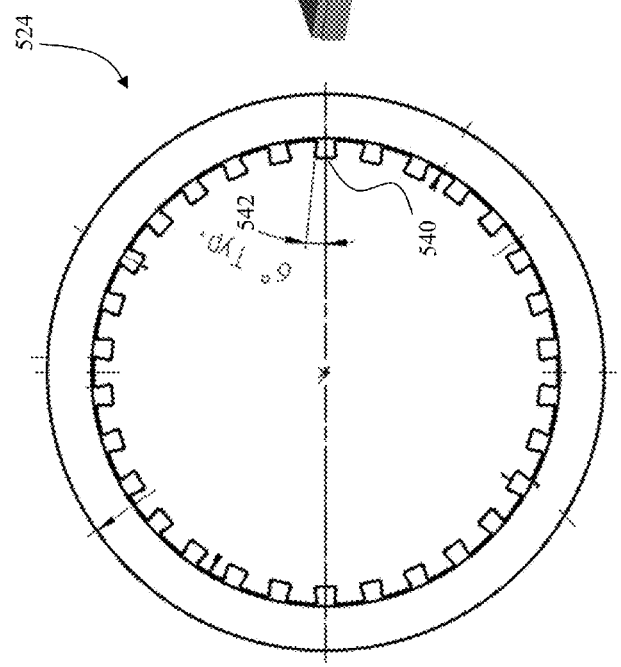
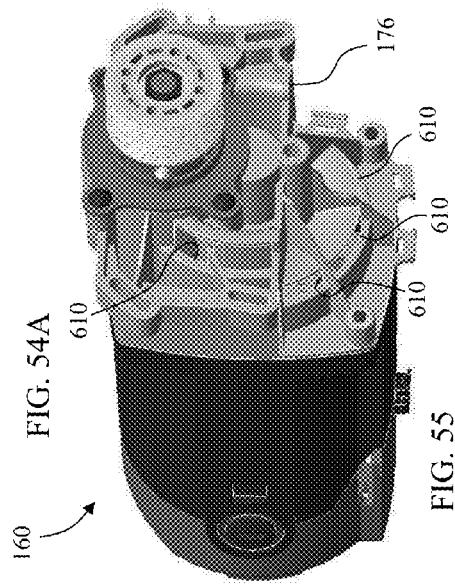
FIG. 54A
FIG. 55

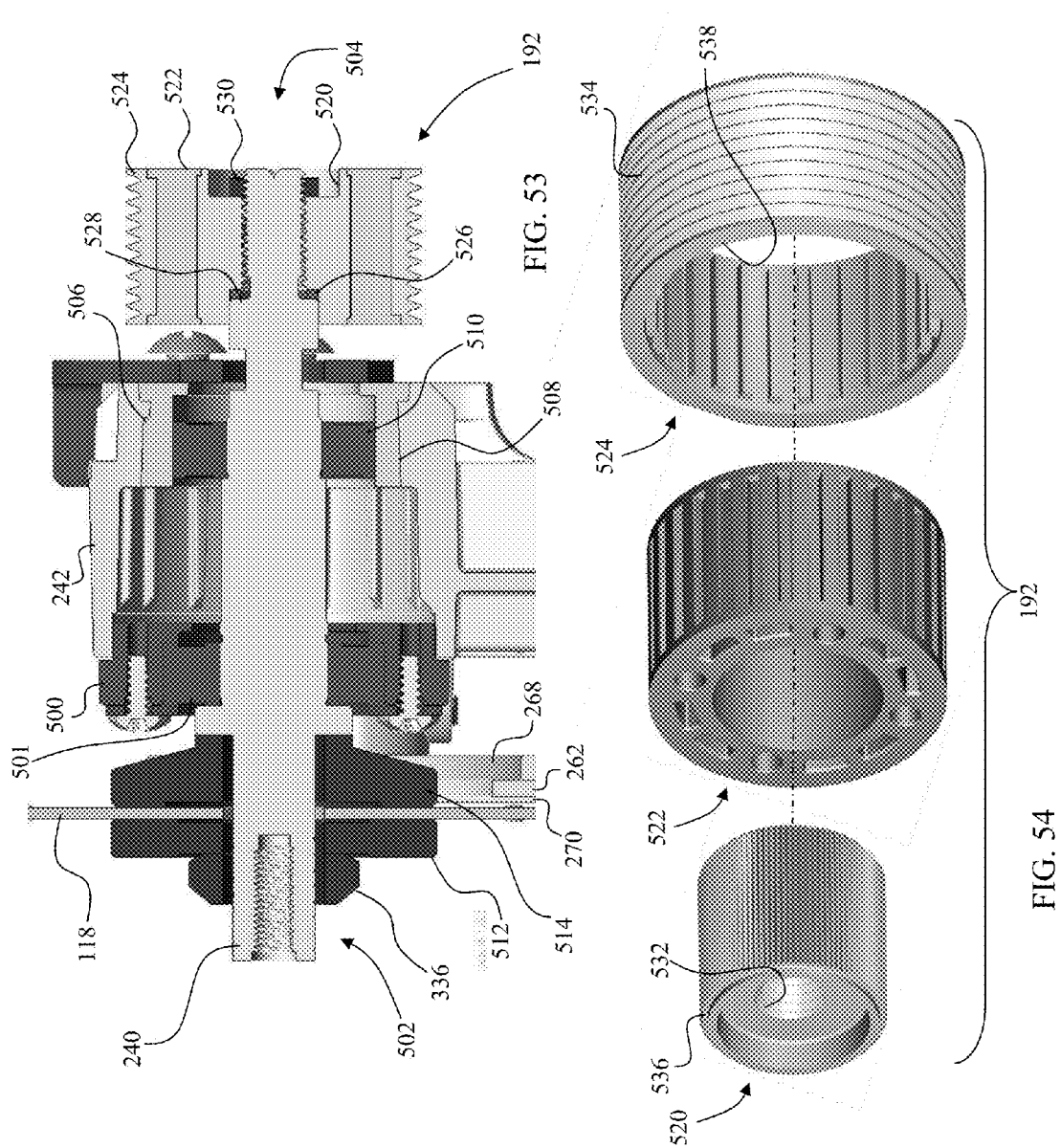

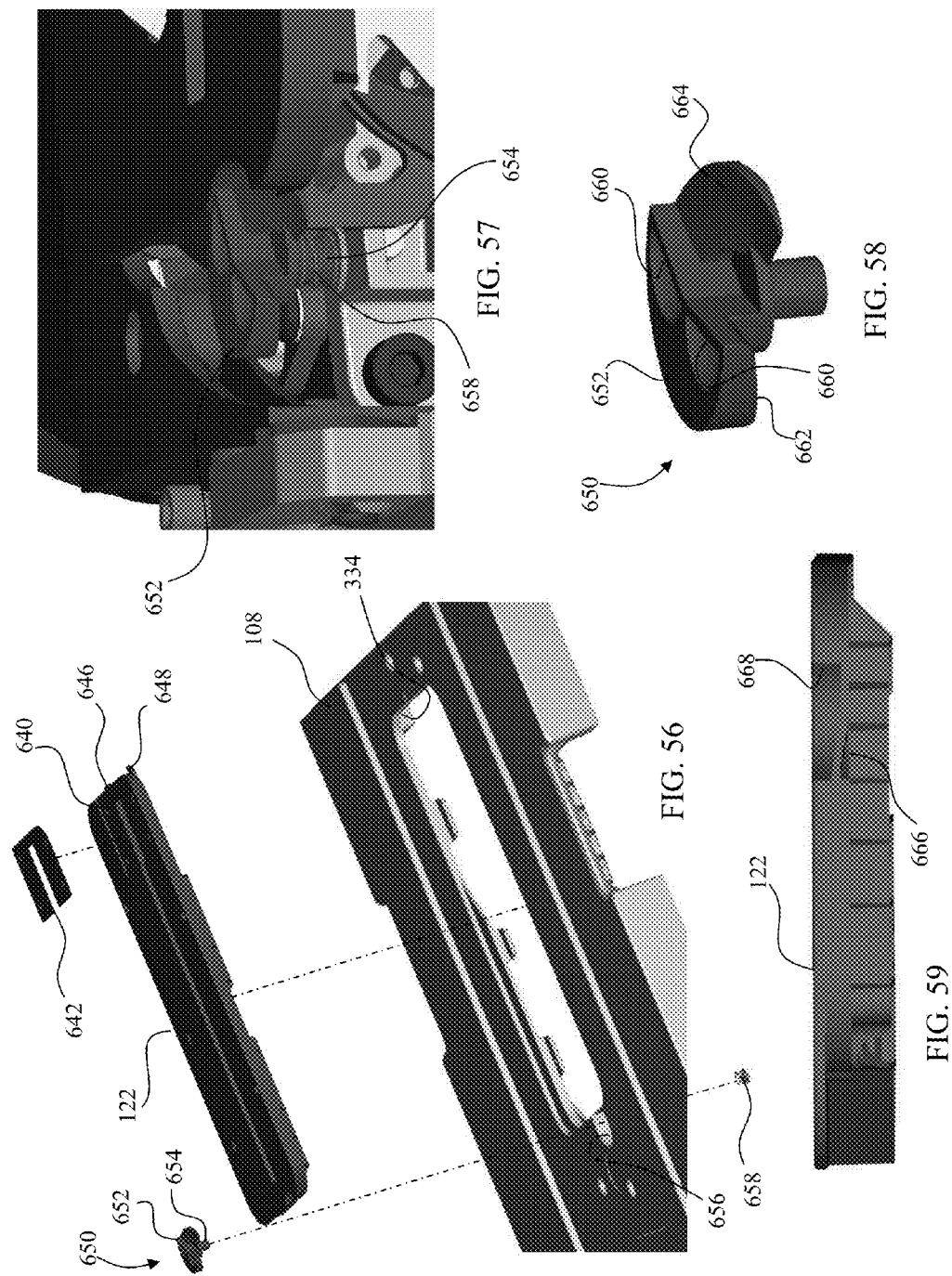

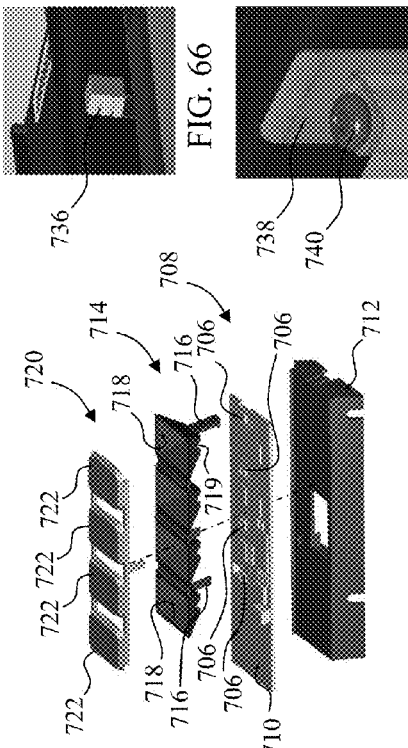
FIG. 66
FIG. 67
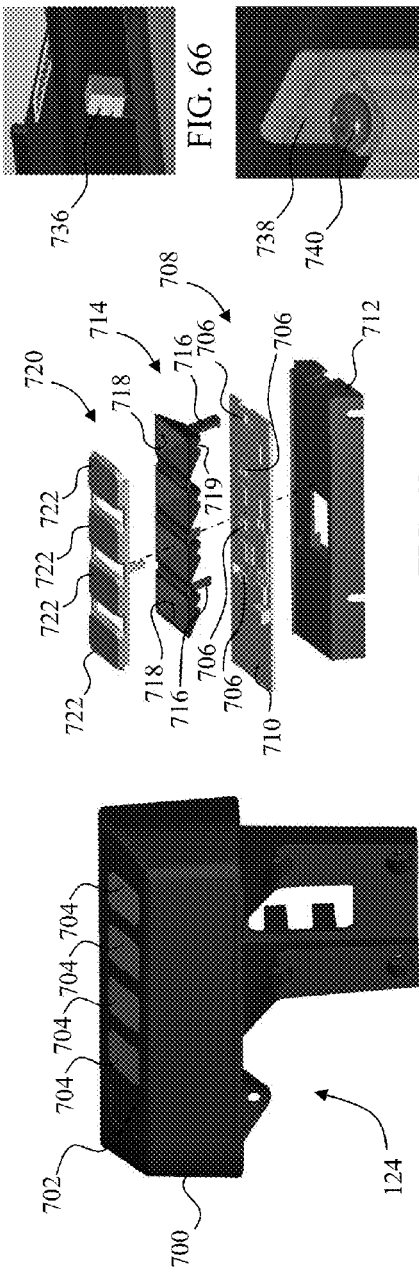
FIG. 63
FIG. 62
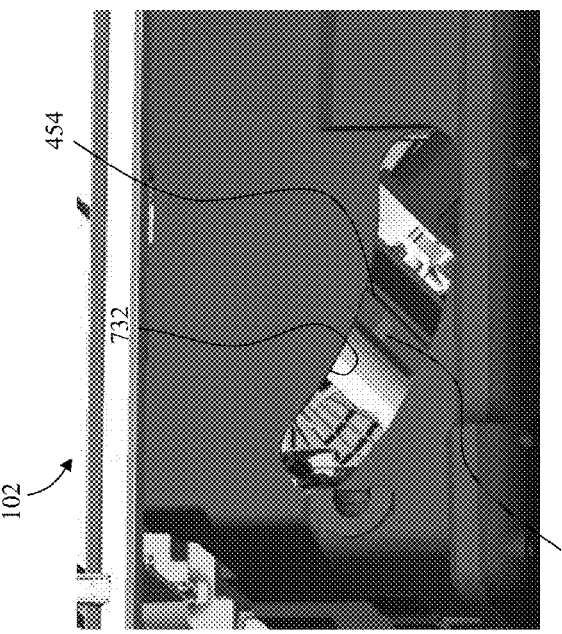
FIG. 65
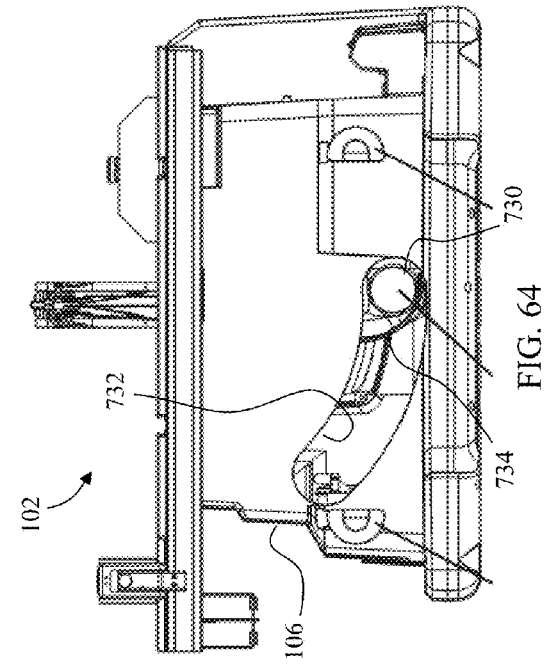
FIG. 64

POWER TOOL WITH DROP ARM ORBIT BRACKET

This application claims priority to U.S. Provisional Application Ser. No. 62/132,004 entitled "TABLE SAW WITH DROPPING BLADE", filed Mar. 12, 2015, and U.S. Provisional Application Ser. No. 62/131,977 entitled "SYSTEM AND METHOD FOR CONTROL OF A DROP ARM IN A TABLE SAW", filed Mar. 12, 2015, the disclosures of which are each incorporated herein by reference in their entirety.

FIELD

The disclosure relates to power tools and more particularly to power tools with exposed shaping devices.

BACKGROUND

A number of power tools have been produced to facilitate forming a workpiece into a desired shape. One such power tool is a table saw. A wide range of table saws are available for a variety of uses. Some table saws such a cabinet table saws are very heavy and relatively immobile. Other table saws, sometimes referred to as jobsite table saws, are relatively light. Jobsite table saws are thus portable so that a worker can position the table saw at a job site. Some accuracy is typically sacrificed in making a table saw sufficiently light to be mobile. The convenience of locating a table saw at a job site, however, makes jobsite table saws very desirable in applications such as general construction projects.

All table saws, including cabinet table saws and jobsite table saws, present a safety concern because the saw blade of the table saw is typically very sharp and moving at a high rate of speed. Accordingly, severe injury such as severed digits and deep lacerations can occur almost instantaneously. A number of different safety systems have been developed for table saws in response to the dangers inherent in an exposed blade moving at high speed. One such safety system is a blade guard. Blade guards movably enclose the saw blade, thereby providing a physical barrier that must be moved before the rotating blade is exposed. While blade guards are effective to prevent some injuries, the blade guards can be removed by a user either for convenience of using the table saw or because the blade guard is not compatible for use with a particular shaping device. By way of example, a blade guard is typically not compatible with a dado blade and must typically be removed when performing non-through cuts.

Table saw safety systems have also been developed which are intended to brake the blade when a user's hand approaches or touches the blade. Various braking devices have been developed including braking devices which are physically inserted into the teeth of the blade. Upon actuation of this type of braking device, however, the blade is typically ruined because of the braking member. Additionally, the braking member is typically destroyed. Accordingly, each time the safety device is actuated significant resources must be expended to replace the blade and the braking member. Another shortcoming of this type of safety device is that the shaping device must be toothed. Moreover, if a spare blade and braking member are not on hand, a user must travel to a store to obtain replacements. Thus, this type of safety system can be expensive and inconvenient.

Another type of table saw uses a safety control system which, in response to a sensed unsafe condition, moves a blade beneath the level of the table. One such system is disclosed in U.S. Pat. No. 8,286,537 which issued on Oct. 16, 2012. The '537 patent discloses a power tool including a workpiece support surface, a swing arm assembly movable along a swing path between a first swing arm position whereat a portion of a shaping device supported by the swing arm assembly extends above the workpiece support surface and a second swing arm position whereat the portion of the shaping device does not extend above the workpiece support surface, and a latch pin movable between a first position whereat the latch pin is engaged with the swing arm assembly and a second position whereat the latch is not engaged with the swing arm assembly.

In general, the power tool in the '537 patent operates in a known manner until an unsafe condition is sensed by the safety control system. In response to the sensed unsafe condition, the safety control system controls a pressure operated actuator to force the latch pin from the first position to the second position and to force the swing arm assembly away from the first swing arm position and toward the second swing arm position. Once the situation initiating movement of the blade has been cleared, the safety system must be reset.

In view of the foregoing, it would be advantageous to provide a power tool with a safety system that could be easily reset. A safety system that did not require special tools to reset the system would be further advantageous. A further advantage would be realized by a safety system that could be reset without the need for extensive disassembly of the power tool.

SUMMARY

In one embodiment, a power tool assembly includes a workpiece support surface, a drop arm assembly including a drop arm frame and an arbor shaft configured to support a shaping device at least partially above the workpiece support surface, the drop arm assembly configured to move within a drop plane to drop the shaping device completely beneath the workpiece support surface, a belt operably connected to the arbor shaft and configured to rotate the arbor shaft through a slave pulley, the slave pulley having a slave pulley axis of rotation, a motor including a power shaft operably connected to the belt through a motor end pulley, the motor end pulley having a motor end pulley axis of rotation, and an orbit bracket configured to orbitally support the drop arm assembly, the orbit bracket defining a drop arm orbit axis located between the motor end pulley axis of rotation and the slave pulley axis of rotation.

In one or more embodiments, the drop arm orbit axis is lower than the motor end pulley axis of rotation.

In one or more embodiments, the orbit bracket is fixedly attached to a height adjust carriage.

In one or more embodiments, the height adjust carriage includes a locator pin and an anti-rotation pin, the orbit bracket includes an alignment bore defining a bore axis and configured to receive the locator pin, and an anti-rotation slot extending lengthwise along a slot axis and configured to receive the anti-rotation pin, and the slot axis is aligned to intersect the bore axis.

In one or more embodiments, the orbit bracket includes an inner face portion configured to contact the height adjust carriage, and the inner face defines a non-zero angle with respect to a plane parallel to the drop plane.

In one or more embodiments, the inner face defines an angle of about 0.65° with respect to a plane parallel to the drop plane.

In one or more embodiments, the orbit bracket includes an orbit shaft hole through which an orbit shaft is inserted, the drop arm frame is orbitally supported by the orbit bracket though the orbit shaft, and the orbit shaft hole includes a lower portion and an upper portion, the lower portion and the upper portion configured to form two shoulders extending within the orbit shaft hole along an axis defined by the orbit shaft hole.

In one or more embodiments, the lower portion is a lower circular portion having a first origin, the upper portion is an upper circular portion having a second origin, and the second origin is offset from the first origin.

In one or more embodiments, the lower portion is a lower circular portion having a first diameter size, the upper portion is an upper circular portion having a second diameter size, and the second diameter size is different from the first diameter size.

In one or more embodiments, a power tool assembly includes at least two set screws, each of the at least two set screws configured to force the orbit shaft against the two shoulders.

In one or more embodiments, the orbit bracket further includes a pair of aligned bores opening to the orbit shaft hole, the orbit shaft includes an orbit shaft bore passing therethrough and aligned with the pair of aligned bores, and the power tool assembly further includes an orbit pin extending through the pair of aligned bores and the orbit shaft bore.

In one embodiment, a method of connecting a drop arm assembly of a power tool assembly, the drop arm assembly including a drop arm frame and an arbor shaft configured to support a shaping device at least partially above a workpiece support surface, the drop arm assembly configured to move within a drop plane to drop the shaping device completely beneath the workpiece support surface, includes defining a slave pulley axis of rotation for a slave pulley configured to be rotated by a belt, defining a motor end pulley axis of rotation for a motor end pulley configured to be operably connected to a power shaft of a motor, and configured to be operably connected to the belt, and defining a drop arm orbit axis located between the motor end pulley axis of rotation and the slave pulley axis of rotation with an orbit bracket configured to orbitally support the drop arm assembly.

In one or more embodiments, defining the drop arm orbit axis comprises defining a drop arm orbit axis that is lower than the motor end pulley axis of rotation.

In one or more embodiments, defining the drop arm orbit axis comprises fixedly attaching the orbit bracket to a height adjust carriage.

In one or more embodiments, fixedly attaching the orbit bracket to a height adjust carriage includes inserting a locator pin of the height adjust carriage into an alignment bore of the orbit bracket, the alignment bore defining a bore axis, and inserting an anti-rotation pin of the height adjust carriage into an anti-rotation slot of the orbit bracket, the anti-rotation slot including a slot axis extending lengthwise along the slot, the slot axis aligned to intersect the bore axis.

In one or more embodiments, fixedly attaching the orbit bracket to the height adjust carriage includes positioning an inner face portion of the orbit bracket against the height adjust carriage, the inner face defining a non-zero angle with respect to a plane parallel to the drop plane.

In one or more embodiments, defining the drop arm orbit axis includes inserting an orbit shaft within an orbit shaft hole of the orbit bracket, and contacting two shoulders, extending along an axis defined by the orbit shaft hole and defined by a lower portion and an upper portion of the orbit shaft hole, with the inserted orbit shaft.

In one or more embodiments, defining the drop arm orbit axis includes forcing the orbit shaft against the two shoulders with at least two set screws.

In one or more embodiments, a method of connecting a drop arm assembly includes aligning an orbit shaft bore with a pair of aligned bores opening to the orbit shaft hole, and positioning an orbit pin through the pair of aligned bores and the aligned orbit shaft bore.

In one or more embodiments, a method of connecting a drop arm assembly includes compressing a pair of bearings against respective inner bearing walls of spaced apart brackets of the drop arm frame using the orbit shaft.

BRIEF DESCRIPTION OF THE DRAWINGS

The accompanying drawings illustrate various embodiments of the disclosure and together with a description serve to explain the principles of the disclosure.

FIG. 6 depicts a side cross-sectional view of the motor assembly of FIG. 4;

FIG. 7 depicts a plan view of the motor assembly of FIG. 4 from the left side of the table saw;

FIG. 8 depicts a plan view of the motor assembly of FIG. 4 from the left side of the table saw after the motor assembly has been rotated to provide a desired tension to the belt of FIG. 4;

FIG. 9 depicts a side plan view of the orbit portion of the height adjust carriage of FIG. 4;

FIG. 10 depicts an exploded view of the orbit portion of FIG. 9;

FIG. 11 depicts a partially exploded view of the exemplary embodiment of an orbit portion;

FIG. 12 depicts a top perspective view of another exemplary embodiment of an orbit bracket;

FIG. 12A depicts a top plan view of the orbit bracket of FIG. 12;

FIG. 22 depicts a side cross-section view of the drop arm frame of FIG. 4 showing a common point shared by the center of gravity and the locus of the ribs of the drop arm frame;

FIGS. 26-29 depict the active shot of FIG. 17 moving the latch assembly of FIG. 17 as the reaction plug of FIG. 24 is threaded into the pyrotechnic housing;

FIGS. 37-39 depict left, top and right plan views of the height adjust carriage showing ribbing to provide increased strength;

FIGS. 40-41 depict perspective views of the bevel carriage showing ribbing to provide increased strength;

FIG. 42 depicts a saw control unit assembly mounted to the bevel carriage;

FIG. 43 depicts an exploded view of the saw control unit assembly of FIG. 42 and the bevel carriage;

FIG. 44 depicts an exploded view of the saw control unit assembly of FIG. 42, the drop arm assembly, and the bevel carriage;

FIG. 52 depicts an exploded view of the trunnions used to pivot the bevel carriage showing electrical isolation between the workpiece support surface and the bevel carriage;

FIG. 53 is a cross-sectional view of the arbor shaft showing electrical isolation of the arbor shaft from the rest of the drop arm assembly and the belt;

FIG. 54 is an exploded view of the pulley of FIG. 53 which provides electrical isolation between the belt and the arbor shaft;

FIG. 54A is a side plan view of the outer shell of FIG. 54 showing dovetail splines;

FIG. 55 depicts a perspective view of the motor assembly showing radially directed vents which direct carbon dust away from one or more of the components;

FIG. 56 depicts a partial exploded view of the throat plate and workpiece support surface of FIG. 1;

FIG. 57 depicts a perspective view of the throat plate engaged by a knob with the workpiece support surface removed;

FIG. 58 depicts a top perspective view of the knob of FIG. 56;

FIG. 59 depicts a side plan view of the front of the throat plate;

FIG. 62 depicts a side perspective view of the HMI unit of FIG. 1;

FIG. 63 depicts an exploded view of the internal components of the HMI unit of FIG. 62;

FIG. 64 depicts a rear plan view of the table saw of FIG. 1 with the bevel carriage at zero degrees;

FIG. 65 depict a rear plan view of the table saw of FIG. 1 with the bevel carriage at forty-five degrees of bevel such that a USB port of the saw control unit assembly is visible through a dust port access slot of the table saw housing; and FIGS. 66-67 depict protective covers which can be used to protect the USB port of FIG. 65 from undesired access.

Corresponding reference characters indicate corresponding parts throughout the several views. Like reference characters indicate like parts throughout the several views.

DETAIL DESCRIPTION OF THE DISCLOSURE

Figure 1:
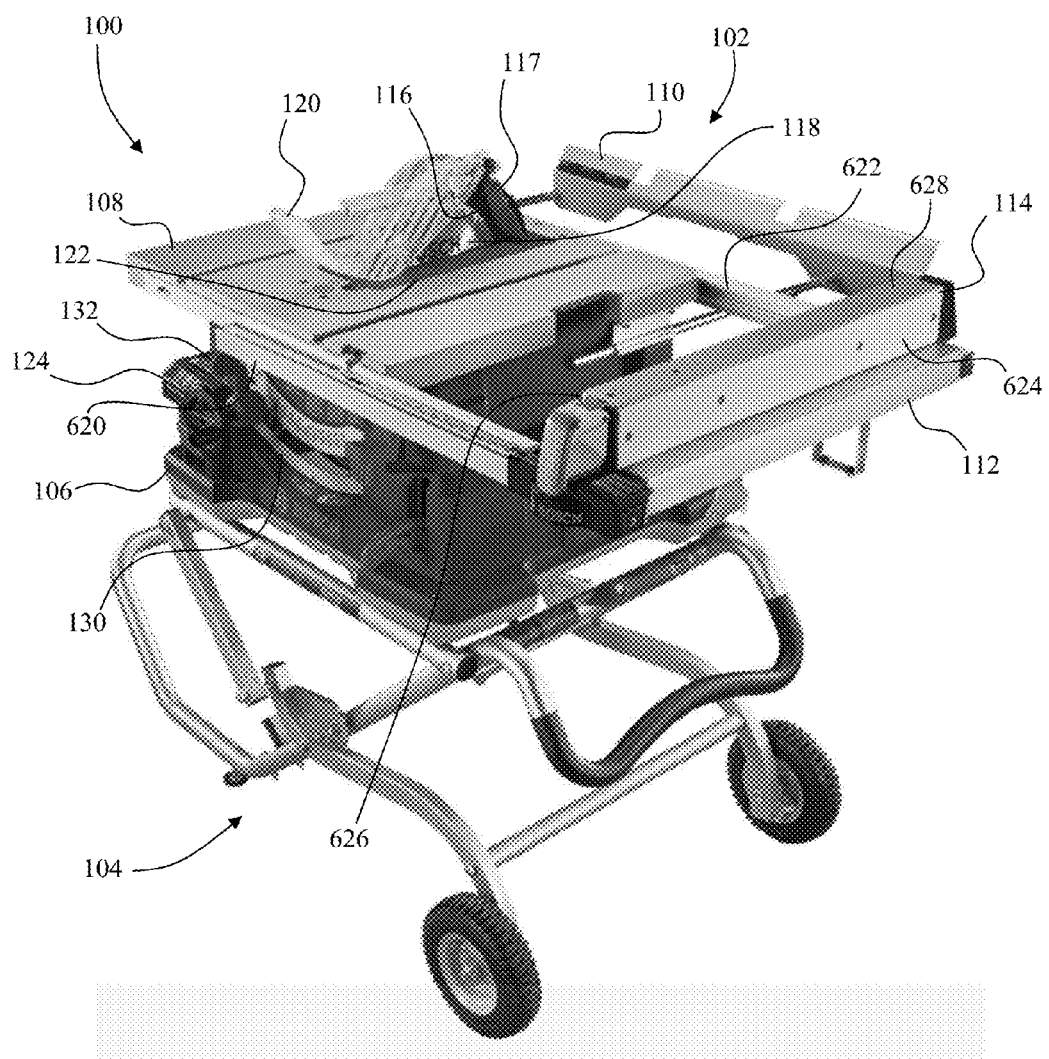
FIG. 1 depicts a top perspective view of a table saw mounted to a wheeled stand.

While the power tools described herein are susceptible to various modifications and alternative forms, specific embodiments thereof have been shown by way of example in the drawings and will herein be described in detail. It should be understood, however, that there is no intent to limit the power tools to the particular forms disclosed. On the contrary, the intention is to cover all modifications, equivalents, and alternatives falling within the spirit and scope of the disclosure as defined by the appended claims.

Referring to FIG. 1, a table saw assembly 100 is shown. The table saw assembly 100 includes a table saw 102 mounted to a wheeled stand 104 The table saw 102 includes a base housing 106 and a workpiece support surface 108. Support surface extensions 110 and 112 are provided to assist in supporting larger workpieces. A fence 114 is provided to guide a workpiece along the workpiece support surface 108.

A riving knife or splitter 116 is positioned adjacent to a shaping device which in this embodiment is a blade 118 which extends from within the base housing 106 to above the workpiece support surface 108. A blade guard 120 and kick-back pawls 117 may be attached to the splitter 116. The blade 118 extends through a slot in a throat plate 122. A human machine interface (HMI) unit 124 is provided at a front portion of the table saw 102.

An angle indicator 130 located adjacent to the HMI unit 124 indicates the angle of the blade 118 with respect to the workpiece support surface 108. A bevel adjust lock 132 may be used to establish the angle of the blade 118 with respect to the workpiece support surface 108 by pivoting a bevel carriage 134 (shown in FIG. 2) within the base housing 106. The bevel carriage 134 is then clamped between the bevel adjust lock 132 and a bevel clamp 133 (see FIG. 3). As further depicted in FIG. 3, a height adjust wheel 136 is used to adjust the height of the blade 118 above the workpiece support surface 108 (not shown in FIG. 3). Rotation of the height adjust wheel 136 rotates a bevel gear 138 which is engaged with a threaded rod 140. The threaded rod 140 is thus forced to rotate either clockwise or counterclockwise, depending upon the direction in which the height adjust wheel 136 is rotated.

Figure 4:
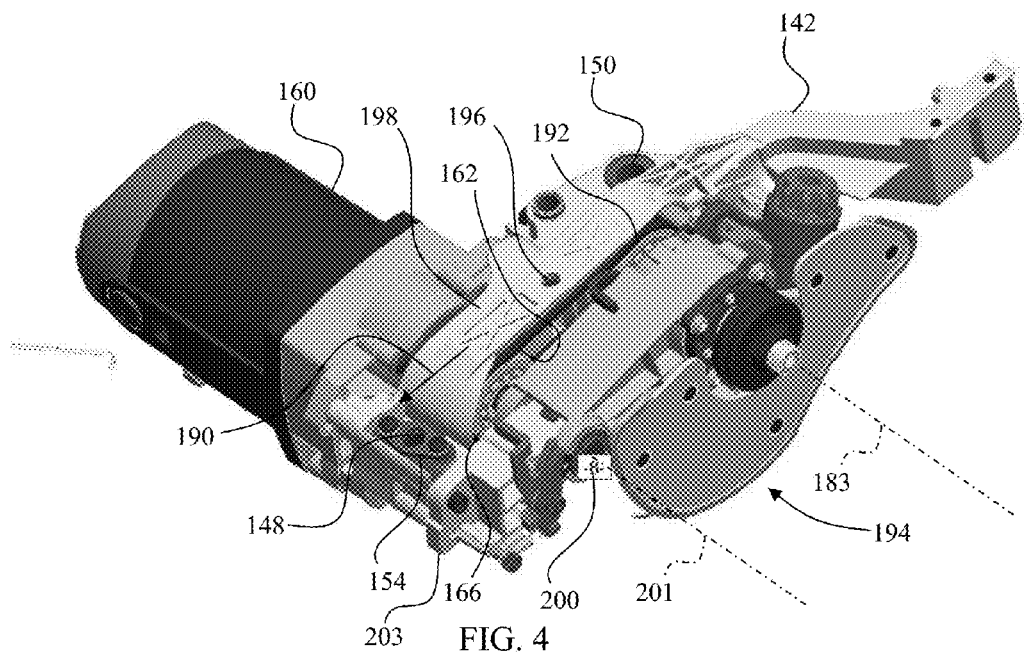
FIG. 4 depicts a top perspective view of the height adjust carriage, drop arm assembly, and motor assembly of the table saw of FIG. 1.

The threaded rod 140 threadedly engages a height adjust carriage 142. In one embodiment, the threaded rod 140 engages a threaded bushing 152 of the height adjust carriage 142. The height adjust carriage 142 is thus forced to move upwardly and downwardly as the threaded rod 140 rotates. Rotation of the height adjust carriage 142 is precluded by a height adjust rod 144 and a height adjust tube 146 which are fixedly attached to the bevel carriage 134. The height adjust rod 144 and a height adjust tube 146 extend through openings 148 and 150, respectively, in the height adjust carriage 142 which are shown in FIG. 4.

Figure 5:
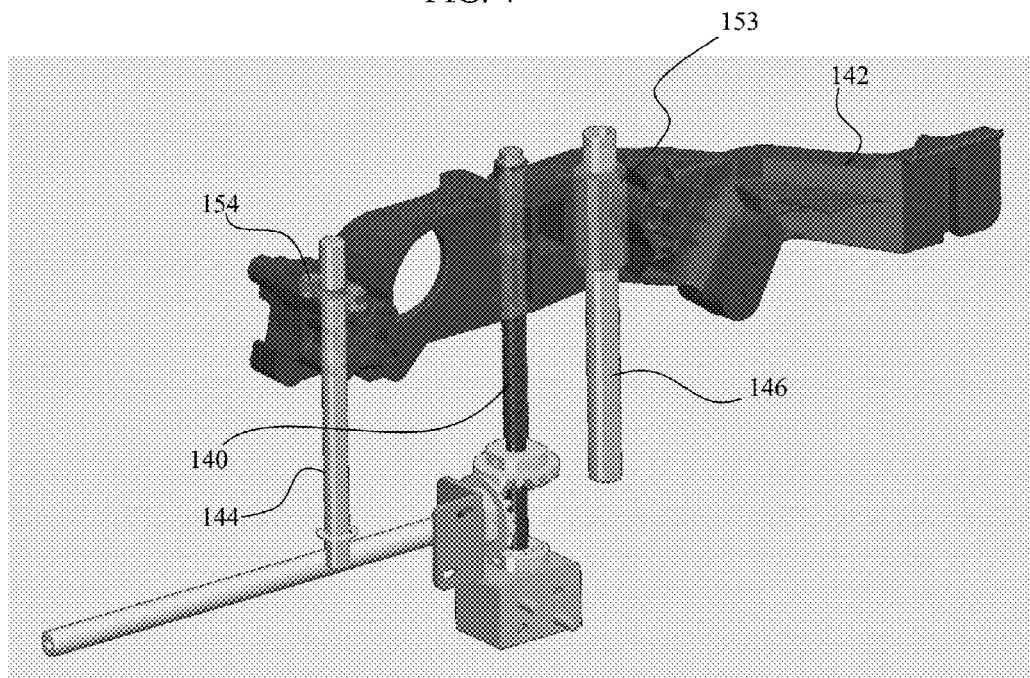
FIG. 5 depicts a top perspective view of the height adjust carriage of FIG. 4 along with rods and tubes used to guide movement of the height adjust carriage.

In order to reduce the weight of the table saw 102, light-weight materials, e.g., aluminum, are used in the manufacture of the height adjust carriage 142. While effective for reducing weight, aluminum is not typically strong enough to withstand the various forces (described more fully below) which are applied to the height adjust carriage 142 without deformation or damage. Accordingly, a powder metallurgy bushing 153 shown more clearly in FIG. 5 is provided within the opening 150. The bushing 153 distributes forces equally along the opening 150, thereby reducing the possibility of damage particularly at the mouth of the opening 150 which could lead to undesired "looseness" between the height adjust carriage 142 and the height adjust tube 146.

Similarly, a powder metallurgy slotted bushing 154 is provided at the upper mouth of the opening 148 to protect the opening 148 from damage from the height adjust rod 144. In other embodiments, one or more of the bushings 153/154 are replaced with a linear bearing or split guide pads. In some embodiments, the bevel carriage 134 is protected by the incorporation of dampening bushings at the locations which support the height adjust rod 144 and/or the height adjust tube 146.

Returning to FIG. 4, a motor assembly 160 is supported by the height adjust carriage 142. The motor assembly 160 drives a belt 162, which in one embodiment is made from a conductive material, through an offset drive shaft 164 and motor end pulley 166 shown more clearly in FIG. 6. The offset drive shaft 164 is offset from a power shaft 168 by a gear 170. The motor assembly 160 is attached to the height adjust carriage 142 in a manner which allows the belt 162 to be tensioned without the need of a linear tensioner as explained with reference to FIG. 7.

As shown in FIG. 7, the motor assembly 160 is attached to the height adjust carriage 142 with four screws 172 which are inserted through respective mounting slots 174 in a motor gear housing 176. The mounting slots 174 are oriented to define a motor mounting axis of rotation 178 which is beneath the axis of rotation 180 of the power shaft 168 which is in turn below the offset shaft 164. Accordingly, rotation in one direction of a jack screw 182 which is threadedly engaged with a plate 184 fixedly attached to the height adjust carriage 142 causes the jack screw 182 to push against a plate 186 attached to the motor gear housing 176. In one embodiment, the plate 184 is either formed as a portion of the height adjust carriage 142 or integrated into the height adjust carriage 142 as a single unit. Thus, the jack screw 182 is threadedly engaged with the height adjust carriage 142 instead. Since the plate 186 which is impinged by the jack screw 182 is located above the motor mounting axis of rotation 178, the motor assembly 160 rotates in the direction of the arrow 188 from the position of FIG. 7 to the position of FIG. 8.

Returning to FIG. 4, the above described movement of the motor assembly 160 causes the motor end pulley 166 which is attached to the offset drive shaft 164 to move in the direction of the arrow 190 away from a slave pulley 192 which is rotatably supported by a drop arm assembly 194. Consequently, the belt 162 is placed into tension. Accordingly, the motor assembly 160 can be placed in the position of FIG. 7 for initial assembly, and then pivoted toward the position depicted in FIG. 8 to a location which provides the desired tension of the belt 162. This configuration requires less linear travel than a linear adjustment mechanism to achieve the same tension within a constrained space. In other embodiments, a spring loaded actuator replaces the jack screw 182 to maintain belt tension over time.

Tension of the belt 162 is verified using a belt tension meter inserted through a belt tension access port 196 (see FIG. 4) in an upper surface of a belt protective cover 198. Positioning of the access port 196 on the upper surface of the belt protective cover 198 allows for access to the belt 162 from above the table saw 102. This allows for easier access to setting the tension of the belt while maintaining structural requirements for the height adjustment carriage without flipping the saw upside down to gain access to the belt 162. While depicted as a circular opening, the access port 196 in other embodiments is in a different geometry and in certain embodiments is provided with a removable plug or an access door.

Continuing with FIG. 4, the drop arm assembly 194 is movably connected to the height adjust carriage 142 by an orbit shaft 200 which defines a drop arm orbit axis 201. The location of the drop arm orbit axis 201 is controlled to be located between the axis of rotation 202 of the offset drive shaft 164 (see FIG. 6), which is also the axis of rotation of the motor end pulley 166, and an axis of rotation 183 of the slave pulley 192 using an orbit bracket 203 further described with reference to FIGS. 9-10.

The orbit bracket 203 includes an orbit shaft hole 204 through which the orbit shaft 200 is inserted. The orbit bracket 203 further includes an alignment bore 205 and an anti-rotation slot 206 which receive a locator pin 207 and anti-rotation pin 208, respectively, which extend from the height adjust carriage 142. The orbit bracket 203 is connected to the height adjust carriage 142 by two screws 210.

The axis 211 of the anti-rotation slot 206 is aligned to intersect the central axis 212 of the alignment bore 205. Accordingly, when the locator pin 207 and the anti-rotation pin 208 are positioned within the alignment bore 205 and the anti-rotation slot 206, respectively, the anti-rotation pin 208 and the anti-rotation slot 206 provide an accurate angular position for aligning the drop arm orbit axis 201.

The incorporation of the orbit bracket 203 with the anti-rotation slot 206 and the anti-rotation pin 226 enable the use of lightweight materials while providing increased accuracy in positioning the saw blade 118. In some embodiments, accurate positioning of an orbit bracket is achieved using two shoulder screws 213 (see FIG. 11), or alignment pins 214 (FIG. 12) which are received within corresponding bores (not shown) on the height adjust carriage 142. Alignment of the saw blade 118 is further provided by incorporating an inner face 228 of the orbit bracket 203 with an angle 230 of about 0.65° with respect to a plane parallel to the drop plane (see below and FIG. 21). This angling of the inner face provides increased accuracy in positioning the saw blade 118 throughout various beveling angles even when the belt 162 is under increased tension.

Figure 13:
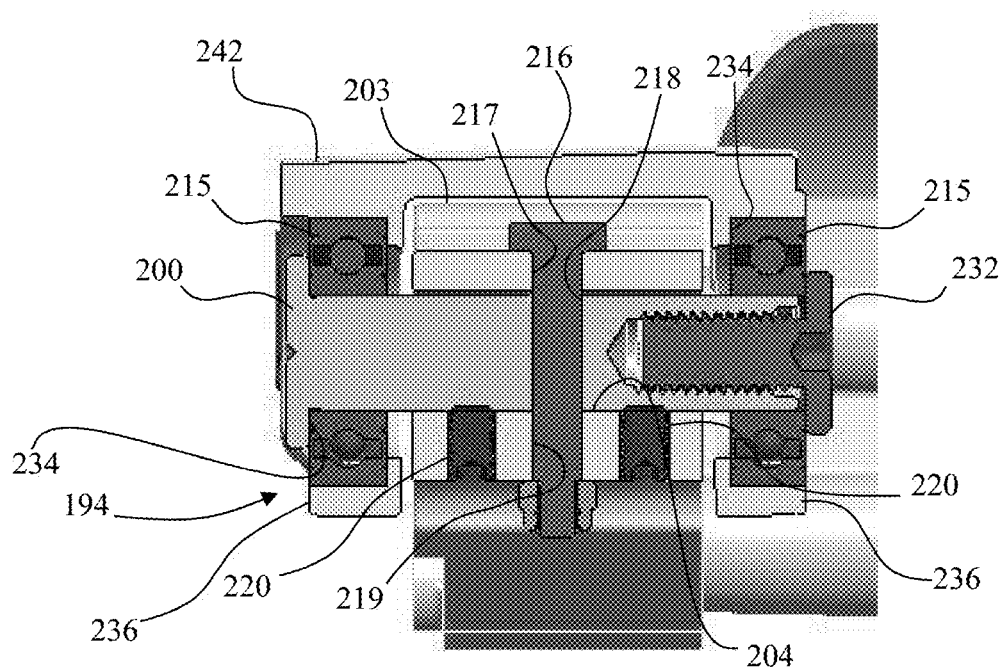
FIG. 13 depicts cross-sectional view of the orbit assembly of FIG. 10 supporting the drop arm assembly.

Increased accuracy in positioning the blade 118 is further provided by the manner in which the drop arm assembly 194 is movably connected to the height adjust carriage 142. Specifically, as shown in FIG. 13, the orbit shaft 200 is movably supported within a drop arm frame 242 of the drop arm assembly 194 by two bearings 215. An orbit bolt 232 threadedly engages the orbit shaft 200 and compresses the bearings 215 against the inner bearing walls 234 of spaced apart brackets 236 of the drop arm frame 242.

Figure 14:
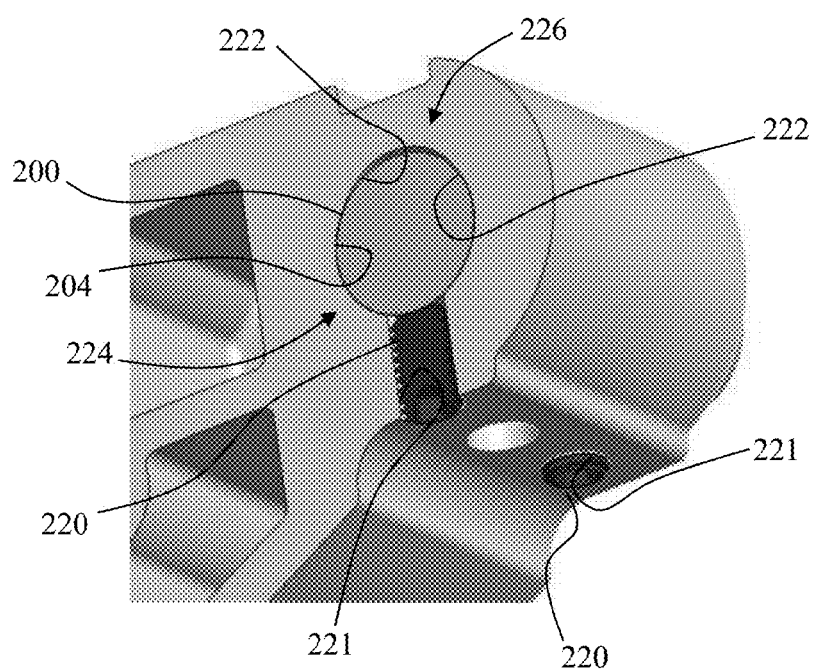
FIG. 14 depicts a bottom perspective cross-sectional view of the orbit assembly of FIG. 13.

An orbit pin 216 extends through aligned bores 217, 218, and 219. The bore 218 extends through the orbit shaft 200. The bore 217 extends through an upper portion of the orbit bracket 203 while the bore 219 extends through a lower portion of the orbit bracket 203. The orbit shaft 200 is thus orbitally fixed with respect to the orbit bracket 203. Two set screws 220 extend through bores 221 in the lower portion of the orbit bracket 203 and anchor the orbit shaft 200 against two shoulders 222 of the orbit shaft bore 204 which are depicted in FIG. 14.

The shoulders 222 are formed in the orbit shaft bore 204 by forming a lower circular portion 224 of the orbit shaft bore 204 and an upper circular portion 226 of the orbit shaft bore 204. The lower circular portion 224 is substantially the same diameter as the diameter of the orbit shaft 200. The upper circular portion 226 in different embodiments has the same or different diameter as the lower circular portion 224. The origin of the upper circular portion 226, however, is offset from the origin of the lower circular portion 224 in a direction opposite the location of the set screws 220.

Accordingly, the upper circular portion 226 provides sufficient clearance for a slip fit between the orbit shaft 200 and the orbit shaft bore 204. At the same time, the junction of the upper circular portion 226 and the lower circular portion 224 form the shoulders 222 which extend along the entire length of the orbit shaft bore 204. Consequently, when the set screws 220 are installed, the set screws 220 force the orbit shaft 200 against the shoulders 222 forming a "three point" lock between each of the set screws and the shoulders.

In some embodiments, the shoulders are replaced by two ball bearings pressed into the drop arm frame 242 using the outer race of the bearing. The orbit shaft 200 is then inserted with one side of the orbit shaft engaging the inner race of one of the bearings. The orbit bolt is then screwed inside the orbit shaft from the opposite direction of the orbit shaft engaging the inner race of the other bearing. The orbit shaft and bolt assembly move the inner races of the two bearings towards each other. With the outer races fixed in the drop arm, and the inner races pulled together, the internal clearances are minimized thus reducing or eliminating the side to side movement due to the internal clearances of the bearings.

Figure 15:
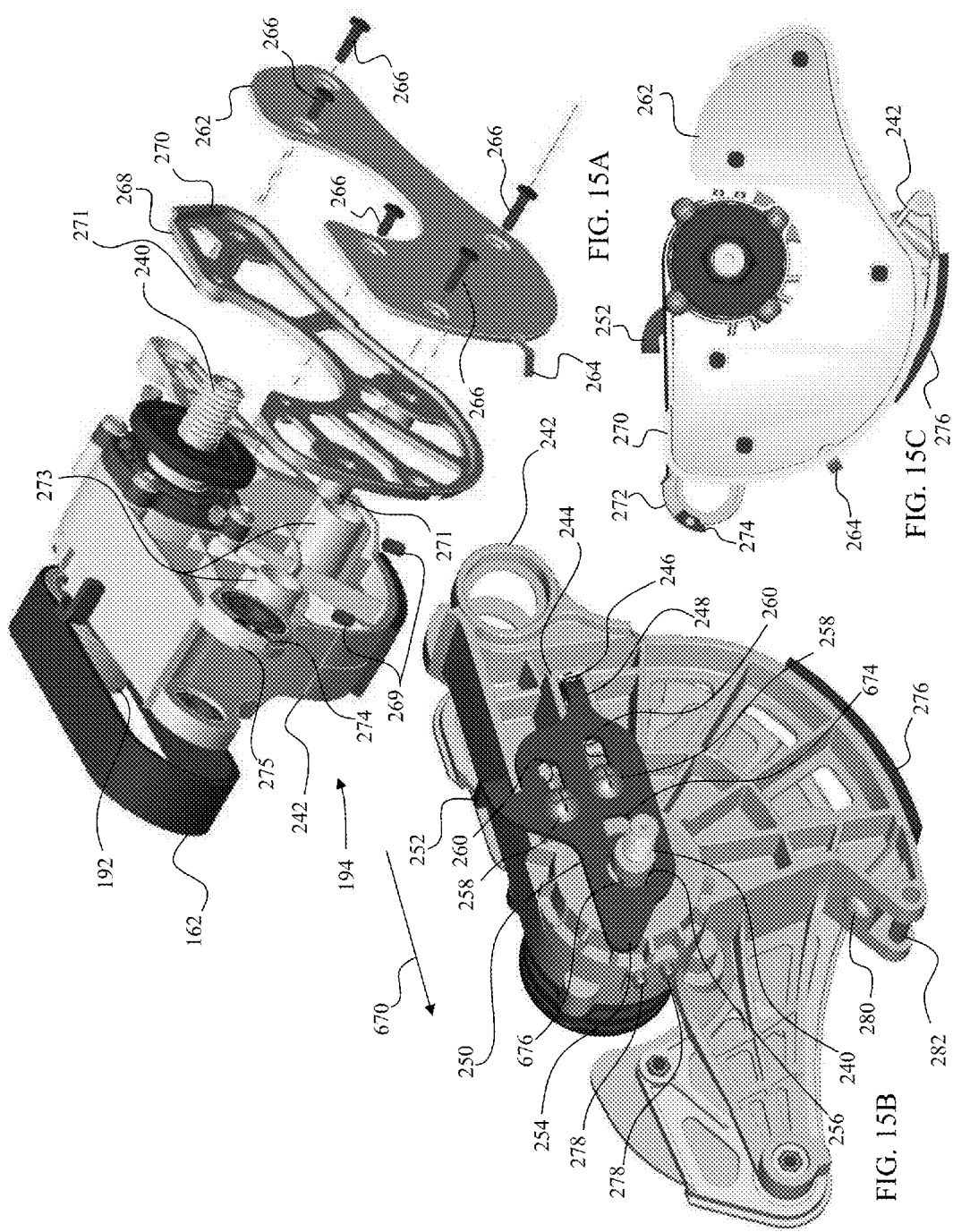
FIG. 15A depicts an exploded view of the drop arm assembly of FIG. 4.
FIG. 15B depicts a side perspective view of the drop arm assembly of FIG. 4.
FIG. 15C depicts a side plan view of the drop arm assembly of FIG. 4.

Turning now to FIGS. 15A-C, the drop arm assembly 194 is depicted in further detail. As noted above, the slave pulley 192 is engaged with the belt 162 and rotatably supported by the drop arm assembly 194. More specifically, the slave pulley 192 is rotatably supported by an arbor shaft 240 which is configured to rotatably support the blade 118 (see FIG. 1). The arbor shaft 240 is rotatably supported within a drop arm frame 242.

The drop arm frame 242 further includes a spring well 244 (FIG. 15B) which houses a spring 246. The spring 246 is operatively connected to a flange 248 of an arbor lock 250. The arbor lock 250 includes an activation arm 252 positioned above the drop arm frame 242 and a locking ramp 254. The arbor 240 extends through an arbor slot 256 and two shoulder screws 258 extend through guide slots 260 and threadedly engage the drop arm frame 242.

The drop arm assembly 194 includes a capacitive coupling plate (CCP) 262 from which extends a connector tab 264. The CCP is mounted to a CCP bracket 268 using screws, five screws either the same or different types of screws 266 are illustrated, which in turn is mounted to the drop arm frame 242 using three set screws 269. The CCP bracket 268 includes a raised lip 270 configured to provide electrical isolation between CCP and the blade. While in the embodiment of FIG. 15a a single piece CCP bracket 268 is depicted, the bracket in other embodiments is formed using multiple modules which in some embodiments are not connected to each other.

The CCP 262 is part of a capacitive sensing system (discussed in further detail below) and is made from electrically conductive material. As most clearly depicted in FIG. 15C, the CCP 262 is not symmetrically shaped. Rather, the center of mass of the CCP 262 is shifted toward the orbiter 272 of the drop arm frame 242. This shape provides sufficient capacitance while reducing the inertia of the drop arm assembly 194. In one embodiment, a finish treatment for the CCP 262 is a non-conductive coating. Acceptable coatings include manganese phosphate for steel CCPs and anodizing for aluminum CCPs. Such thin non-conductive coverings provide isolation in case of accidental contact between the blade and a conductive portion of the CCP during heavy cuts due to blade deflection.

The CCP bracket 268 is made from a non-conductive material. In one embodiment, a plastic with a low di-electric constant which is not affected by water is used in order to minimize the capacitance variation in the system. The CCP bracket 268 is inserted into the drop arm and manually adjusted to the proper distance from the blade then locked in place by set screws 269 (see FIG. 15A, only two are shown).

Specifically, the screws 266 are used to mount the CCP 262 to the CCP bracket 268 by threadedly engaging protuberances 271. Optionally, a fastening element such as a nut (not shown) in addition to the screws 266 could be used to mount the CCP 262 to the CCP bracket 268. In another embodiment, the CCP bracket 268 is overmolded to the CCP 262 as a single unit. Thus, any fastening element is no longer required. The protuberances 271 are then inserted into wells 273 formed in the drop arm frame and adjusted to set the CCP 262 at the desired location. Then, the set screws 269 are inserted through bores in the wells 273 to engage the protuberances 271.

The protuberances 271 electrically isolate the screws 266 and the CCP 262 from the drop arm frame 242. The raised lip 270 of the CCP bracket 268 wraps around the CCP 262 along the outside edge to protect the CCP 262 from incidental contact with the blade during heavy cutting.

Continuing with FIG. 15C, the orbiter 272 includes rebound ledges 274/275 (see also FIG. 15A) and a pad 276 is mounted to a lower surface of the drop arm frame 242. As best viewed in FIG. 15B, the drop arm assembly 194 further includes two alignment pins 278, a semi-spherical strike pin 280, and a latch pin 282 supported by the drop arm frame 242.

Figure 16:
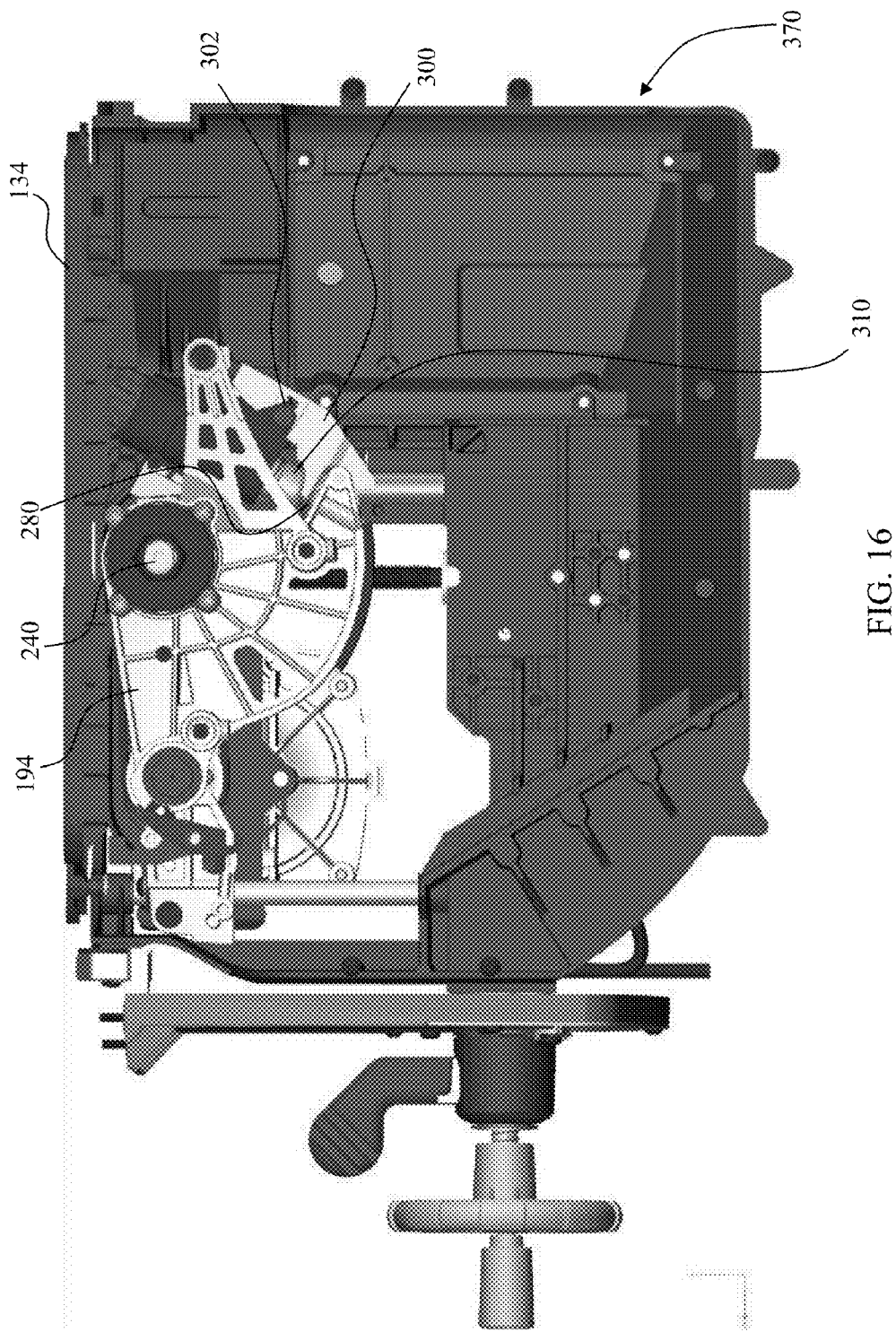
FIG. 16 depicts a side plan view of the right side of the table saw of FIG. 1 with the housing and workpiece support surface removed.

Referring now to FIG. 16, the drop arm assembly 194 is maintained in a latched position by a latch 300. The latch 300 is movably connected to the pyrotechnic housing 322 by a pin 302. The latch 300, also shown in FIG. 17, includes a latch pin receiving area 304 which engages the latch pin 282 in the latched position. The latch 300 further includes two prongs 306. The latch 300 is biased by a spring 308 such that the prongs 306 are biased into contact with an actuator which in one embodiment is a shot 310.

Figure 18:
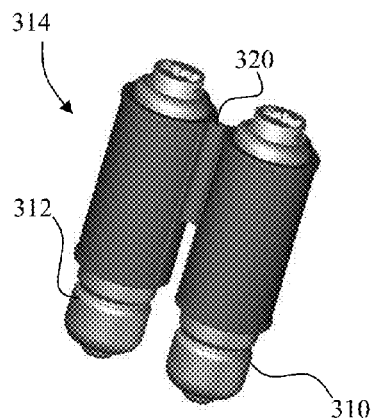
FIG. 18 depicts a perspective view of the cartridge of FIG. 17.

The shot 310 is paired with another actuator or shot 312 by a cartridge 314 shown in FIG. 18. A bridge 320 joins the two actuators or shots 310/312 in the cartridge 314.

Figure 17:
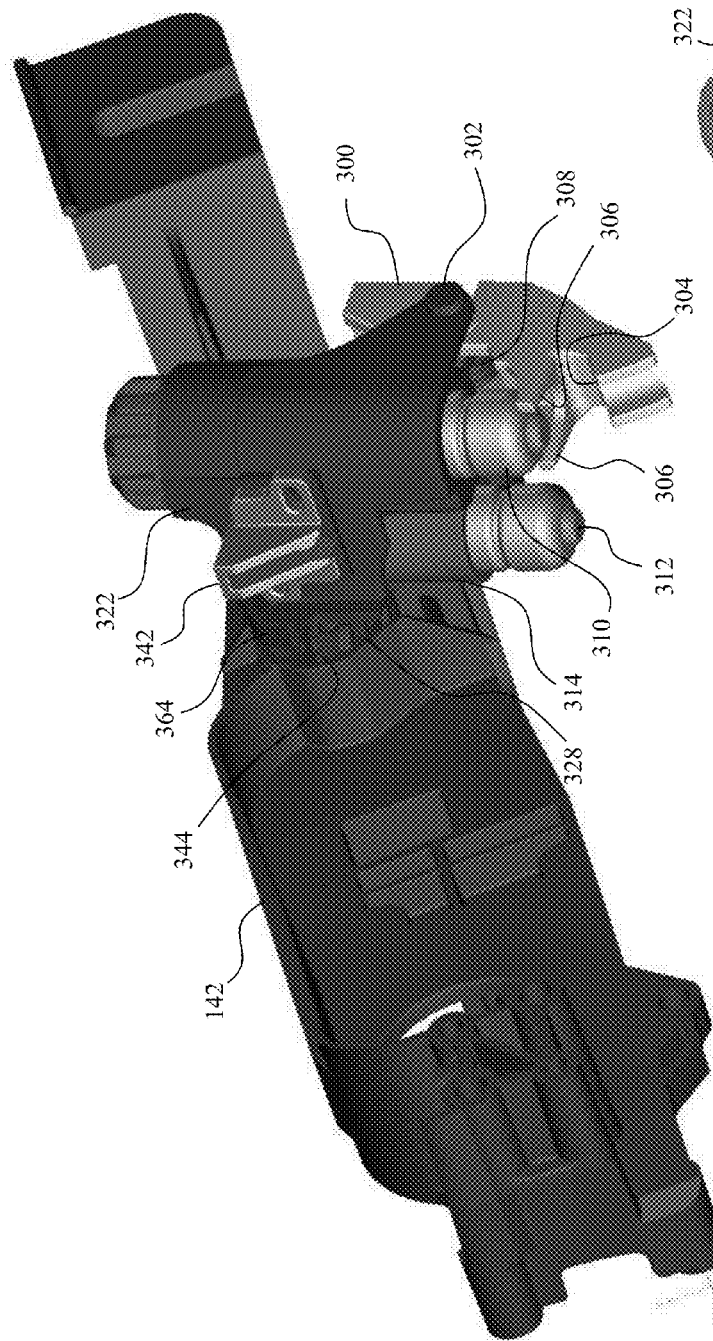
FIG. 17 depicts a perspective view of the height adjust carriage of FIG. 4 with the pyrotechnic assembly and latch assembly mounted to the height adjust carriage.
Figure 19:
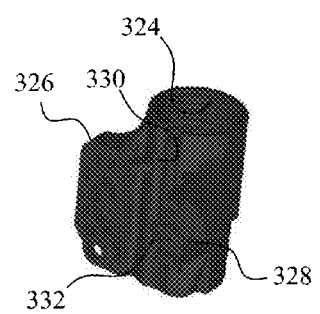
FIGS. 19 and 20 depict perspective views of the pyrotechnic housing of FIG. 17.
Figure 20:
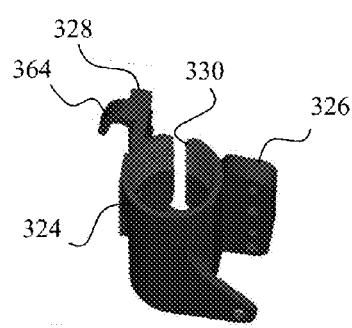

The cartridge 314 is shown in FIG. 17 mounted in a pyrotechnic housing 322, also referred to as an actuator housing. The pyrotechnic or actuator housing 322, also shown in FIGS. 19-20, includes an internally threaded chamber 324, a mounting plate 326, and a finger plate 328. A locking ramp 364 is located at an upper portion of the finger plate 328. A slit 330 extends along one side of the internally threaded chamber 324 and terminates at a rounded end portion 332. This configuration allows for optimal positioning of the active shot as explained with further reference to FIGS. 21 and 22.

Figure 21:
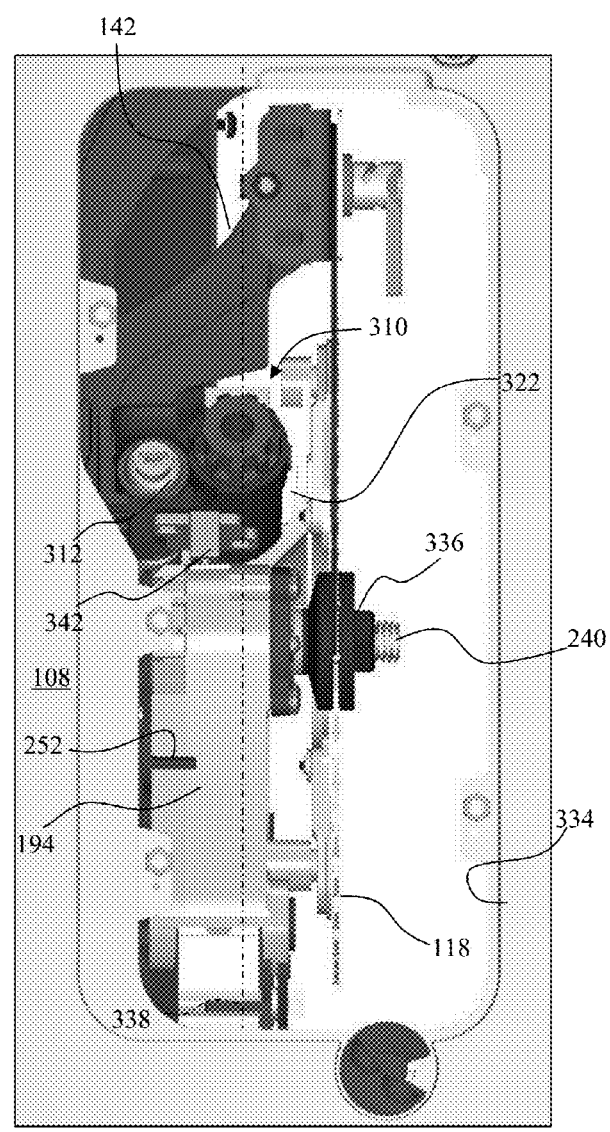
FIG. 21 depicts a partial top plan view of the table taw of FIG. 1 with the throat plate removed.

FIG. 21 depicts a partial top plan view of the table saw 102 with the throat plate 122 removed from a throat plate opening 334. Visible through the throat plate opening 334 is an arbor nut 336 and the blade 118 mounted to the arbor shaft 240. The drop arm 194 and a portion of the height adjust carriage 142 is also visible through the throat plate opening 334. Also depicted in FIG. 21 is a drop plane 338. The drop plane 338 is a plane that is aligned with where the shot 310 interfaces with the drop arm assembly and along which the drop arm assembly moves in a substantially parallel manner when a saw control system is activated as discussed more fully below. FIG. 22 depicts a cross-sectional view of the drop arm assembly 194 taken parallel to the drop plane 338 of FIG. 21.

FIGS. 21 and 22, thus show that the drop arm assembly 194 is configured such that the center of gravity 340 of the drop arm assembly 194 lies on, in proximity to or adjacent to the drop plane 338 so that the transfer of force from the shot to the semi-spherical strike pin 280 occurs as close as practicable to the drop plane 338.

Accordingly, the pyrotechnic housing 322 is configured to center the active shot substantially on the drop plane 338. This results in reduced stress for the system and decreased drop time for the drop arm assembly 194. Additionally, the inactive shot (shot 312 in the configuration of FIG. 21) is positioned inwardly of the active shot while maintaining the cartridge 314 in a location which is easily accessible through the throat plate opening 334. This configuration ensures that the inactive shot does not interfere with the movement of the drop arm assembly 194.

To further improve the alignment of the active shot with the semi-spherical strike pin 280, an alignment housing 342 is mounted to the pyrotechnic housing 322 as shown in FIG. 17. The alignment housing 342 receives the hardened steel alignment pins 278 (FIG. 15B) thereby reducing the blade deflection under load, as well as, ensuring proper alignment between the active shot and the semi-spherical strike pin 280. Providing the pins 278 in the drop arm assembly 194 further provides enhanced stabilization of the drop arm frame 242 against side loading or torsional loading against the orbit shaft 200 (FIG. 4). Using hardened steel pins as alignment pins extending from the aluminum drop arm frame 242 achieves this benefit while allowing for a light weight/low inertia drop arm frame 242.

While two pins 278 are shown in FIG. 15B, in other embodiments only one is used. Yet in another embodiment, one or more protrusion or surfaces is used in the system. Additionally, in some embodiments the alignment housing is positioned in the drop arm assembly 194 while the hardened steel pins extend from the pyrotechnic housing 322. In further embodiments, the alignment features are integrated into the latch 300 and/or the shots.

Figure 23:
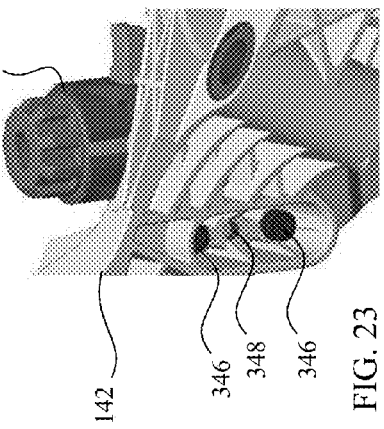
FIG. 23 depicts a side perspective view of the pyrotechnic housing mounted to the height adjust carriage.

The slit 330 in the housing 322 receives the bridge 320 of the cartridge 314. The slit 330 thus allows for a spare shot to be incorporated into the cartridge 314. The slit 330, however, weakens the pyrotechnic housing 322. Consequently, support is required at both a forwardly location and a rearwardly location with respect to the slit 330 to preclude failure of the pyrotechnic housing 322. While the rearward mounting plate 326 is firmly bolted to the height adjust carriage 142 with two bolts 346 and a pin 348 shown in FIG. 23, bolting of the forward portion of the pyrotechnic housing 322 would result in unacceptably high stresses, even with the provision of the rounded end portion 332 which inhibits cracking at the end of the slit 330. It is for this reason that the finger plate 328 is used.

As depicted in FIG. 17, the forward portion of the pyrotechnic housing 322 is supported by contact between the finger plate 328 and finger ribbing 344 on the height adjust carriage 142. The finger plate 328 thus transfers force in the direction of the pyro firing (beneath the pyrotechnic housing 322), but does not constrain the pyrotechnic housing 322 in any other degree of freedom, which greatly reduces the stress levels in this part and allows the pyrotechnic housing 322 to be made from affordable and lightweight material. In this embodiment, three fingers are provided. In other embodiments, more or fewer fingers are provided.

The disclosed pyrotechnic system provides a number of additional features. By way of example, the pyrotechnic assembly 350 of FIG. 24 includes two shots 310/312. While the saw control system in some embodiments provides an electrical check to make sure that an unused shot is connected, the safety control system in some embodiments is not configured to ensure that the connected shot is properly installed in the pyrotechnic housing 322 and thus aligned with the semi-spherical strike pin 280. The pyrotechnic assembly 350 shown in FIG. 24, however, is configured to ensure that a user does not mistakenly connect the wrong shot.

Figure 24:
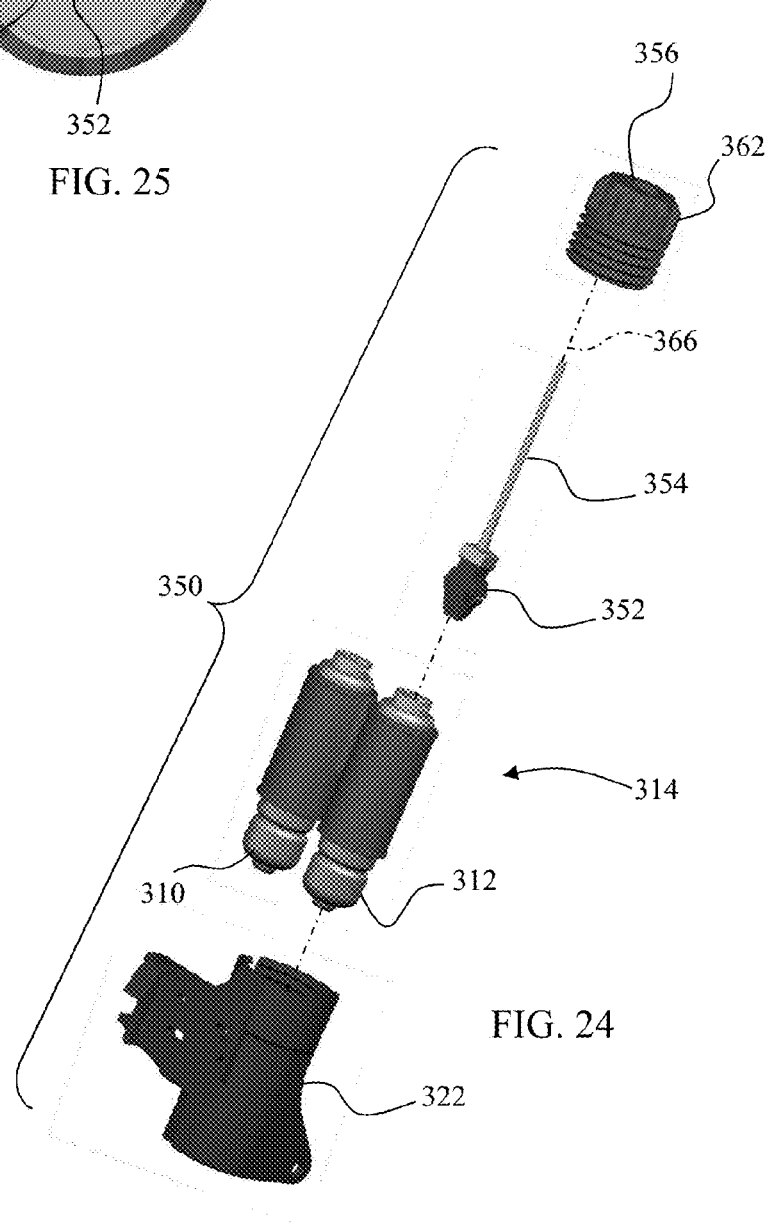
FIG. 24 depicts an exploded view of the pyrotechnic assembly of FIG. 17.

FIG. 24 depicts the pyrotechnic assembly 350 which includes the pyrotechnic housing 322, the cartridge 314, and the shots 310/312 which have been described above. The pyrotechnic assembly 350 further includes an electrical connector 352, a connecting wire 354, and a reaction plug 356.

Figure 25:
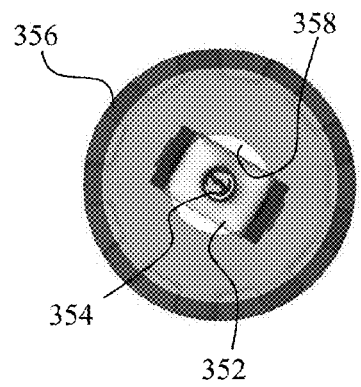
FIG. 25 depicts a top plan view of the active shot of FIG. 17 with an electrical connector.

Typically, the shots 310/312 and the cartridge 314 are provided as a single unit. Additionally, the table saw 102 is provided with the connecting wire 354 inserted through an opening 358 of the reaction plug 356 as shown most clearly in FIG. 25. One end of the connecting wire 354 is permanently attached to the saw control unit, while the other end is attached to the electrical connector 352.

The pyrotechnic assembly 350 is assembled by providing the shots 310/312 in the cartridge 314. The shots 310/312 and the cartridge 314 are then inserted into the pyrotechnic housing 322. For a new unit, either shot 310/312 is aligned with the housing axis 366 and inserted into the internally threaded chamber 324. If the unit has previously been used, then the unused shot is inserted into the internally threaded chamber 324.

Next, the electrical connector 352 is inserted into a plug of the shot 310/312. The reaction plug 356 is then threaded into the internally threaded chamber 324. Because the electrical connector 352 is larger than the opening 358 (see FIG. 25), the reaction plug 356 can only be threaded into the internally threaded chamber 324 if the electrical connector 352 is connected to a shot located in the internally threaded chamber 324. The incorporation of the electrical connector 352 and a mating connector on the shots thus enables the incorporation of a mechanical/electrical lockout as described above.

In other embodiments, the reaction plug 356 and electrical connector 352 can be replaced with a snap-on cap or a flashlight-like cap. Additionally, the electrical connector 352 can be omitted in such embodiments and replaced with a simple pigtail connector.

The reaction plug 356 further assists in a lock-out function which ensures that the cartridge 314 is adequately seated within the pyrotechnic housing 322. As shown in FIG. 26, the spring 308 biases the latch 300 in a clockwise direction. When the reaction plug 356 is not adequately threaded into the internally threaded chamber 324 as depicted in FIG. 26, the prongs 306 force the shot 312 upwardly within the internally threaded chamber 324 and the latch 300 is rotated in a clockwise direction to a position whereat a lower surface of a lower portion 360 of the latch 300 is located within the drop path of the latch pin 282. Accordingly, counterclockwise orbiting of the drop arm assembly 194 is constrained by contact between any portion of the drop arm assembly and the lower portion 360. Consequently, the latch pin 282 cannot be received within the latch pin receiving area 304.

By rotating the reaction plug 356 in a direction to further engage the internally threaded chamber 324, the reaction plug 356 is forced against the cartridge 314 or the shot 310, forcing the shot 310 or the cartridge 314 against the prongs 306. This forces the spring 308 into compression, and rotates the latch in a counterclockwise direction resulting in the configuration of FIG. 27. In FIG. 27, counterclockwise orbiting of the drop arm assembly 194 is still constrained by contact between the latch pin 282 and the lower surface of the lower portion 360.

Continued rotation of the reaction plug 356 fully seats the cartridge 314 within the internally threaded chamber 324, further rotating the latch 300 to the configuration of FIG. 28. In FIG. 28, the latch 300 has been rotated so that a side surface of the lower portion 360 is within the drop path of the latch pin 282. Accordingly, by orbiting the drop arm assembly 194 in a counterclockwise direction, the latch pin 282 presses against the side surface of the lower portion 360 further compressing the spring 308 and rotating the latch 300 in the counterclockwise direction as the latch pin 282 slides upwardly along the side surface of the lower portion 360.

Continued counterclockwise orbiting of the drop arm assembly 194 moves the latch pin 282 above the side surface of the lower portion 360. Accordingly, the spring 308 forces the latch 300 to rotate in a clockwise direction resulting in the configuration of FIG. 29. In FIG. 29, the latch 300 has rotated in the clockwise direction such that the latch pin 282 is received within the latch pin receiving area 304.

Accordingly, if the reaction plug 356 is not sufficiently threaded into the pyrotechnic housing 322, the latch 300 provides a mechanical "lockout" and the drop arm assembly 194 cannot be raised into a cutting/latched position. While described with respect to a pyrotechnic device, the reaction plug 356 can be used with actuators of any desired type to provide both mechanical and electrical lockout capabilities.

The reaction plug 356 is typically configured such that it can be easily turned by hand. In one embodiment, the reaction plug 356 includes ribs 362 (see FIG. 24) which are configured to allow for tightening/loosening. The ribs 362 are further configured to allow for tightening/loosening of the reaction plug 356 with a spanner wrench (not shown). In some embodiments, the reaction plug is a hex shaped plug that can be turned with a standard hex wrench instead of a spanner. In further embodiments, a locking feature separate from the reaction plug is provided which requires a tool to allow rotation of the reaction plug. By way of example, the locking feature may be a spring loaded component (ball bearing, spring tab) which is operated by pushing on a locking tab that needs a screwdriver or similar tool to release. In other embodiments, a hole and extruded pin with a circular reaction plug are used which require a special wrench to tighten and loosen the reaction plug.

Figure 30:
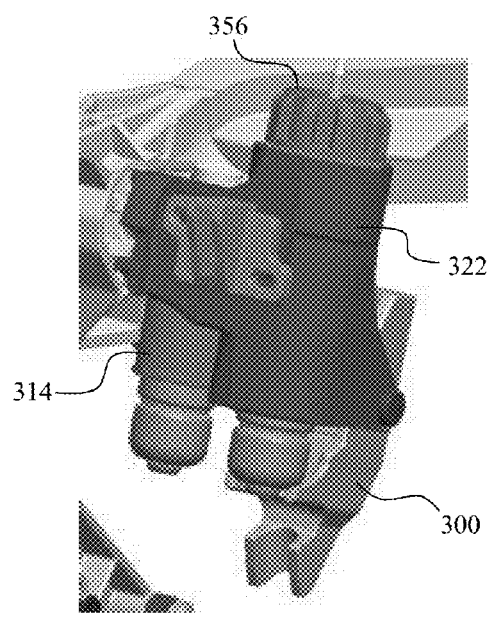
FIGS. 30-31 depict the latch assembly of FIG. 17 biasing the active shot outwardly from the pyrotechnic housing when the reaction plug is removed.
Figure 31:
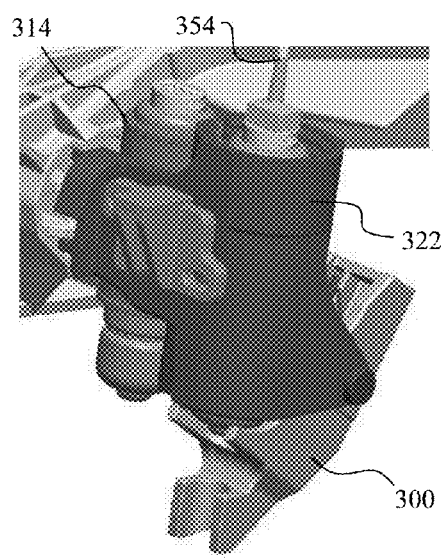

The biasing of the latch 300 into the active shot by the spring 308 also assists in removal of the cartridge 314 as explained with initial reference to FIG. 30. FIG. 30 depicts the cartridge 314 fully seated within the pyrotechnic housing 322. For removal of the cartridge 314, the reaction plug 356 is removed. Because the latch 300 is biased against the active shot, removal of the reaction plug 356 allows the cartridge 314 to be pushed upwardly to the position depicted in FIG. 31. A user can then grasp the upper portion of the cartridge 314 above the inactive shot rather than pulling the cartridge 314 using the connecting wire 354.

Referring back to FIG. 16, when the active shot 310 is activated by a saw control system, the shot 310 applies force to the drop arm assembly 194 through the semi-spherical strike pin 280 which is substantially aligned with the drop plane 338 by the housing 322. This force is transferred to the latch pin 282 (see FIG. 29) which forces the latch 300 to compress the spring 308 and moves the latch pin receiving portion 304 of the latch 300 out of the drop path of the latch pin 282. The drop arm assembly 194 then orbits in a clockwise direction moving the blade 118 (see FIG. 2) which is mounted to the arbor shaft 240 under the workpiece support surface 104.

Figure 32:
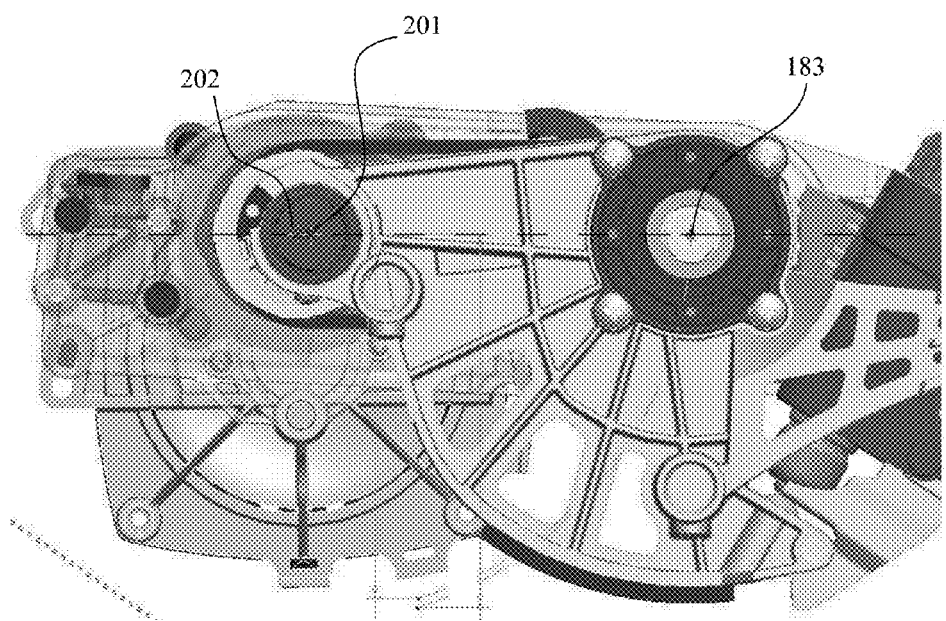
FIG. 32 depicts a side plan view of the drop arm assembly of FIG. 4 indicating the axes of the various components.

As discussed above, the location of the drop arm orbit axis 201 is controlled to be located between the axis of rotation 202 of the offset drive shaft 164 and an axis of rotation of the slave pulley 192. This arrangement provides for increased dropping speed of the drop arm assembly 194 and prevents damage or stretching of the belt that would lead to degradation of powertrain performance as explained with further reference to FIGS. 6, 15A, and 32. FIG. 32 shows the drop arm orbit axis 201, the axis of rotation 202 of the offset drive shaft 164, and the axis of rotation 183 of the slave pulley 192. Since the motor end pulley 166 is mounted to the height adjust carriage 142 and the slave pulley 192 is mounted on the drop arm assembly 194, tensioning of the belt 162 as described above moves the motor end pulley 166 away from the drop arm orbit axis 201 (to the left in FIG. 32). As a result, during a drop arm drop the slave pulley 192 moves toward the motor end pulley 166. Accordingly, the axis 183 moves closer to the axis 202. This reduction in distance de-tensions the belt which results in a faster drop time.

Figure 33:
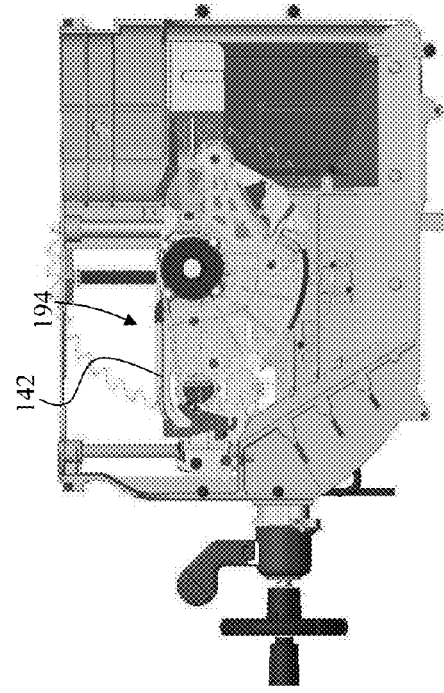
FIG. 33 depicts a side plan view of the table saw of FIG. 1 after the drop arm assembly has been dropped against a surface while the height adjust carriage is at an upper position.

The impact of the drop arm assembly 194 is absorbed in part by contact between the pad 276 and a surface 374 as shown in FIG. 33. The pad 276 is mounted on the drop arm assembly 194 using any desired mounting means such as glue, fasteners, clamp plate, etc. Positioning the pad 276 on the drop arm assembly 194 allows a pad with a smaller sized geometry than mounting the pad on the surface 374.

Figure 2:
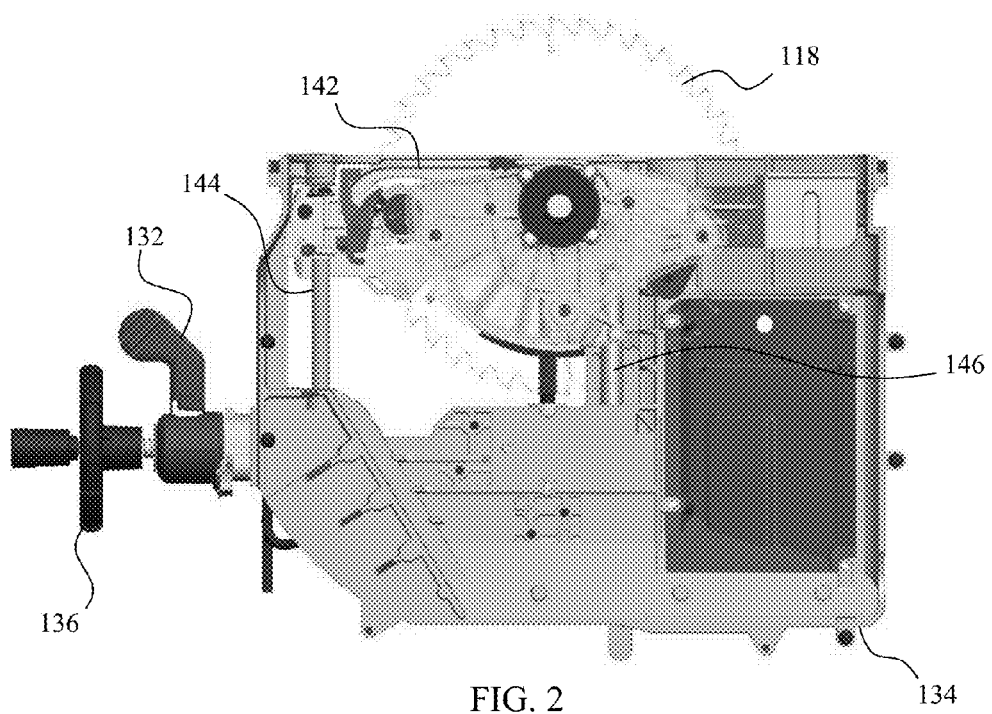
FIG. 2 depicts a side plan view of the right side of the table saw of FIG. 1 with the housing, bevel plate, and workpiece support surface removed and the height adjust carriage at an upper position.
Figure 3:
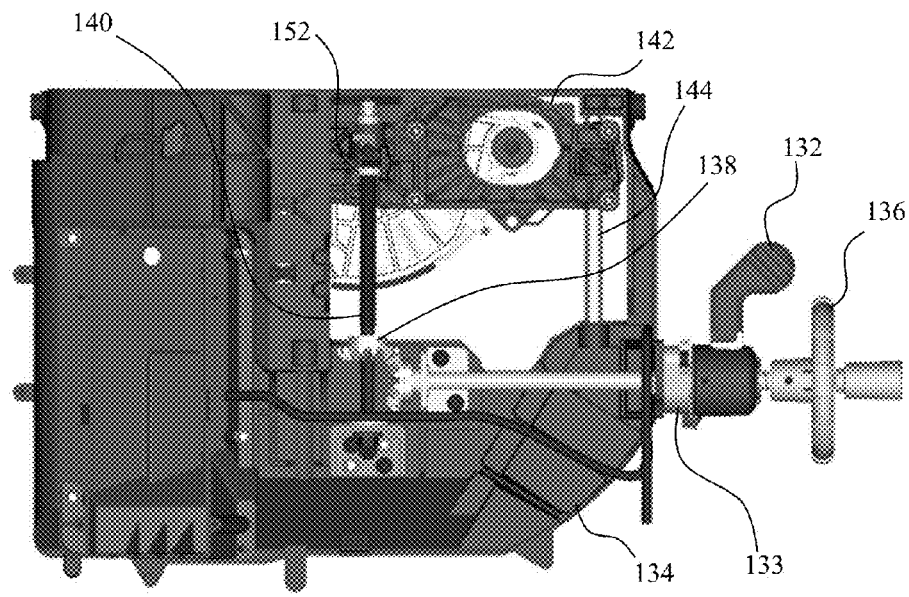
FIG. 3 depicts a side plan view of the left side of the table saw of FIG. 1 with the housing, workpiece support surface, and bevel plate removed.
Figure 34:
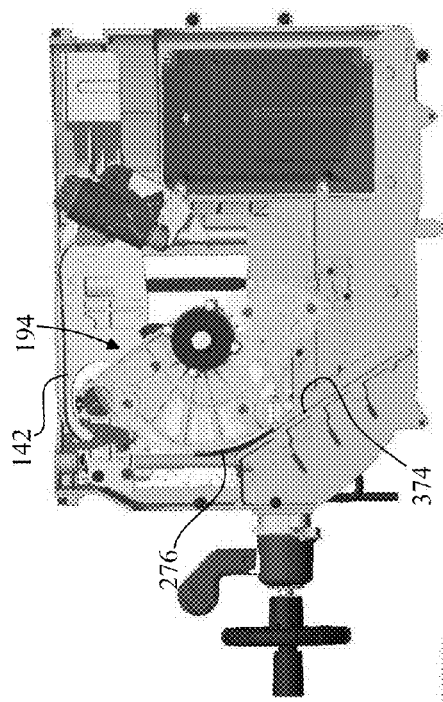
FIG. 34 depicts a side plan view of the table saw of FIG. 1 with the drop arm assembly latched and the height adjust carriage at a lower position.
Figure 35:
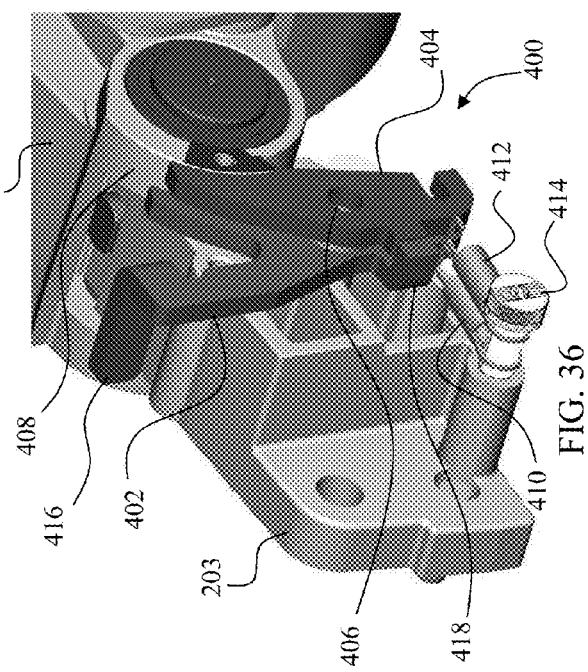
FIG. 35 depicts a side plan view of the table saw of FIG. 1 after the drop arm assembly has been dropped against a surface with the height adjust carriage at a lower position.

For example, FIG. 33 depicts the location of impact between the drop arm assembly 194 and the surface 374 when the height adjust carriage 142 is initially in a fully raised position as depicted in FIG. 2. When the height adjust carriage 142 is at a lowermost position as depicted in FIG. 34, the drop arm assembly 194 contacts the surface 374 at a lower location as depicted in FIG. 35. Consequently, covering the span of the surface 374 which is contacted by the drop arm assembly 194 would take more material than is required to cover the portion of the drop arm assembly 194 which contacts the surface 374. Consequently, mounting the pad 276 on the drop arm assembly 194 reduces the amount of pad material that is required.

The configuration of the drop arm frame 242 is thus selected in part to provide the desired surface for contacting the surface 374. Returning to FIG. 22, the configuration of the drop arm frame 242 is further selected to reduce the weight of the drop arm frame 242. As depicted in FIG. 22, a number of ribs 376/378/380/382 extend from a lower surface 384 to an opening 386 which receives the arbor shaft 240. The ribs 376/378/380/382 provide strength which allows for less material to be used and/or for lighter materials to be used. In the context of the drop arm assembly 194, this translates into a reduced moment of inertia thereby providing a more rapid lowering of the drop arm assembly in response to a sensed unsafe condition.

The ribs 376/378/380/382 also reduce the rebound force of the drop arm assembly 194 once the pad 276 contacts the surface 374. As shown in FIG. 22, the ribs 376/378/380/382 each define a respective axis 388/390/392/394. The axes 388/390/392/394 intersect at a locus 396 which coincident with, adjacent to, in proximity to the center of gravity 340. This configuration reduces bounce-back energy and allows further reduction in the amount or weight of materials.

Figure 36:
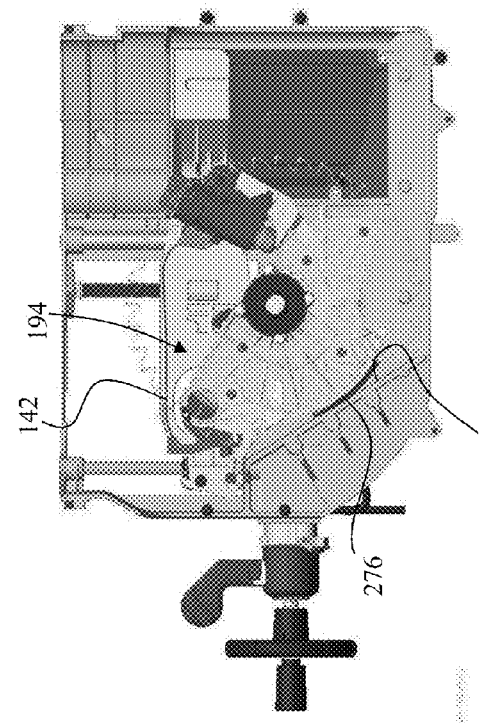
FIG. 36 depicts a top perspective view of the bounce back latch assembly mounted to the height adjust carriage.

The above described configuration is typically insufficient for dissipation of all bounce back energy of the drop arm assembly 104. Accordingly, a bounce back latch assembly 400 is provided as shown in FIG. 36. The bounce back latch assembly 400 includes a lower latch 402 and an upper latch 404 independently movably connected to the orbit bracket 203 by a pin 406. The pin 406 in some embodiments is sized longer than necessary to provide for tolerance. A wave washer (not shown) may be used between the head of the pin 406 and the latch 404 to allow for the tolerance while providing desired tension to the system.

The lower latch 402 and an upper latch 404 are biased into contact with a rebound surface 408 of the drop arm frame 242 by two springs 410 and 412, respectively. The springs 410/412 are anchored to the orbit bracket 203 by a bolt 414. The bounce back latch assembly 400 further includes a reset lever 416 which extends from the lower latch 402 to a location above the orbit bracket 203.

During orbiting of the drop arm assembly 194 in response to a sensed unsafe condition, the rebound surface 408 orbits in a clockwise direction (viewed as in FIG. 36). As the rebound surface 408 orbits, the rebound ledge 275 (see FIG. 15A) orbits past the lower latch 402. Accordingly, the spring 410 biases the lower latch 402 into contact with the rebound surface 408 at a location inwardly of the outermost extent of the rebound ledge 275. Subsequently, the drop arm assembly 194 contacts the surface 374 as described above. When the drop arm assembly 194 rebounds away from the surface 374, the lower latch 402 comes into contact with the rebound ledge 275 precluding further upward (counterclockwise) movement of the drop arm assembly 194.

The rebound ledge 274 (see FIG. 15A) and the upper latch 404 operate similarly. The main difference is that for the rebound ledge 274 to orbit beneath the upper latch 404, more clockwise orbiting of the rebound surface 408 is required. This occurs, for example, when the height adjust carriage 142 is positioned toward its highest location such as the height depicted in FIG. 16. Accordingly, at higher locations, rebound protection is provided by the rebound ledge 274 and the upper latch 404 while at lower heights, such as the height depicted in FIG. 34, rebound protection is provided by the rebound ledge 275 and the lower latch 402.

When a user wishes to return the drop arm assembly 194 to a latched position, the user pushes against the reset lever 416 which moves the lower latch 402 away from the rebound surface 408. Additionally, a lip 418 of the lower latch 402 contacts the upper latch 404, moving the upper latch 404 away from the rebound surface 408. The drop arm assembly 194 can then be raised into a latched position held by the latch 300.

The above described use of ribbing to reduce the weight of the drop arm assembly 194 also reduces the overall weight of the table saw 102, making the table saw 102 more portable. Ribbing is used in other areas of the table saw for the same purpose. For example, FIGS. 37-39 depict various views of the height adjust carriage 142. Extensive ribbing 420 is provided in order to accommodate the large impact forces from the shots 310/312.

Similarly, the bevel carriage 134 includes ribbing 422/424/426/428 along with other structural features as depicted in FIGS. 40-41. Also shown in FIGS. 40-41 are openings 430 and 432. The ribbing 424 and 428 provides structural support for the surface 374 which is impacted by the drop arm assembly 194 as discussed above. The ribbing 422 and 426 and other structural features provide support which allows for the openings 430 and 432 to be accommodated. The opening 430 is needed in order to allow for mounting of the motor assembly 160 (FIG. 4) while the opening 432 is provided to enhance operation of the saw control unit as will be discussed in further detail below. In addition, the removal of the material to form the opening 432 reduces the weight of the saw.

Accordingly, in one embodiment ribbing is used throughout the table saw 102 to keep the table saw 102 light and portable without compromising structure. Nonetheless, selective areas and components of the table saw 102 are provided in the form of stronger materials to ensure optimal functioning of the table saw 102 even after multiple pyrotechnic activations. For example, forces of the impact of a drop transfer through the drop arm, orbit bracket and into the height adjust rods. Accordingly, the orbit bracket 203 (FIG. 10) and the area of the bevel/height adjust carriages around the height adjust rods are typically formed with stronger and or heavier material. Likewise the alignment housing 342 (FIG. 17), the pyrotechnic housing, and the latch 300 in some embodiments are made from stronger material such as by using powder metallurgy, zinc die-casting, or the like.

Because many of the structural components are formed of lightweight material, forces from the pyrotechnics and from arresting the drop arm assembly 194 are not damped. The transferred forces must therefore be accounted for when positioning sensitive components. One such sensitive component is housed within a saw control unit assembly 450 in FIG. 42 which is mounted to the bevel carriage 134. The saw control unit assembly 450 includes electronics used to control the table saw assembly 100. Such electronics include a memory with program instructions stored therein which, when executed by a processor of the saw control unit assembly 450, controls the safety control system.

As shown in FIG. 43, the saw control unit assembly 450 includes a printed circuit board (PCB) 452 which is mounted to an outer housing 454. The outer housing 454 is in turn mounted to an inner housing 456. The saw control unit assembly 450 is then mounted to the bevel carriage 134. The inner housing 456 and the outer housing 454 electrically isolate the PCB 452 from the bevel carriage 134. A USB port 458 (see FIG. 42) provides for electronic access to the PCB 452.

The foregoing configuration of the saw control unit assembly 450 provides damping of the forces from the pyrotechnics and from arresting the drop arm assembly 194. Nonetheless, some of the forces may still be transferred to the PCB 452. Accordingly, if the PCB 452 is mounted perpendicular to either of these force vectors, a large impact/vibration load will be applied to the PCB 452, which can cause damage to the PCB 452. Accordingly, as best viewed in FIG. 44, the PCB 452 is mounted at about a 15 degree angle with respect to the plane in which the forces of the shot and the impact on the surface 374 are applied.

If the PCB 452 is mounted in close proximity and parallel to a conductive body that is carrying a signal such as the bevel carriage as discussed in further detail below, the signal can be capacitively coupled to the PCB 452 and cause unwanted noise in other signals. Consequently, the bevel carriage 134 and the saw control unit assembly 450 are configured such that there are no parallel metal surfaces to couple noise to the PCB 452. It is for this reason that the opening 432 is provided in the bevel carriage 134.

While the mounting of the PCB 452 on the bevel carriage 134 is convenient for purpose of wire routing as discussed further below, in some embodiments the PCB 452 is mounted on a plastic base or underside of the workpiece support surface. In these embodiments, the transfer of force and signal coupling are reduced, but wire routing is typically less optimal. Mounting the PCB 452 to the underside of the workpiece support surface has the added advantage of using the workpiece support surface as a heat sink for heat generating components of the PCB 452 such as a triac. In another embodiment, a component such as a second PCB that generates heat other than the PCB 452 is mounted to the underside of the workpiece support surface and uses the workpiece support surface as a heat sink.

Figure 45:
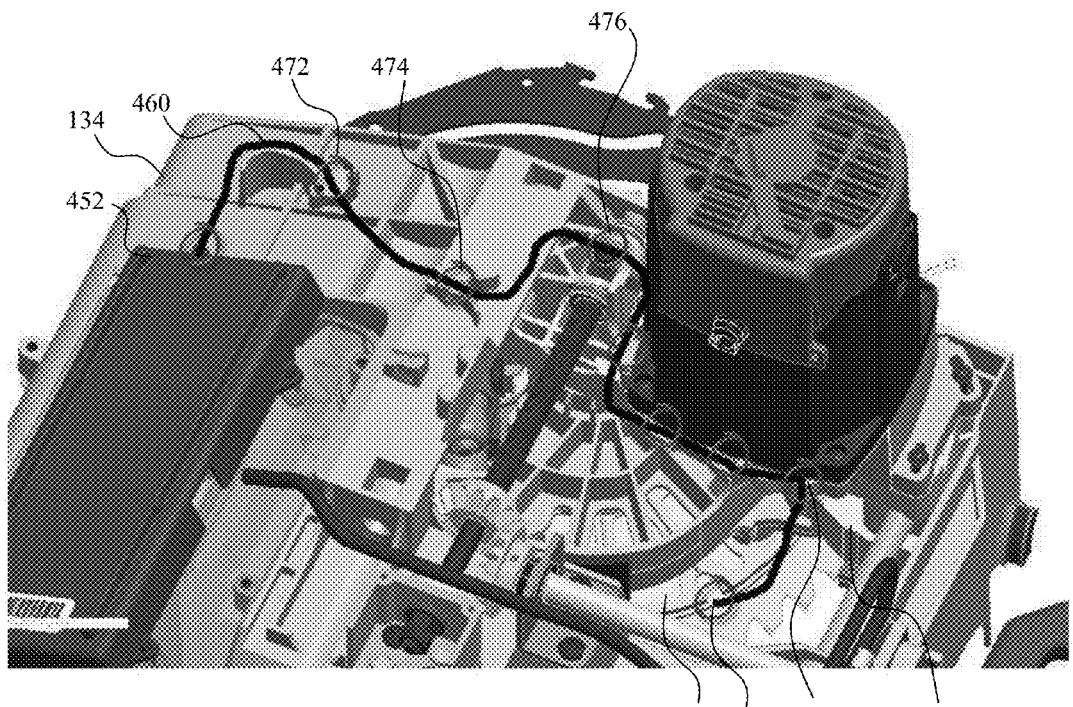
FIG. 45 depicts a side perspective view of the bevel carriage showing coaxial wiring used to provide communication with various components.
Figure 46:
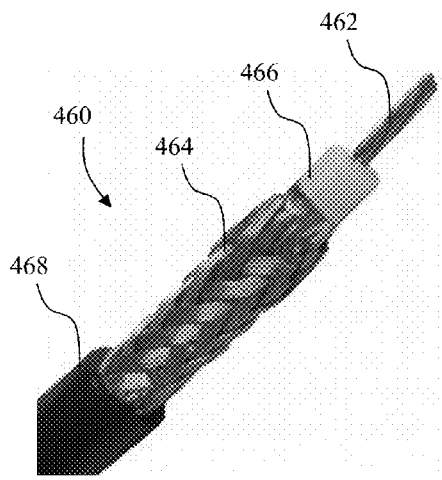
FIG. 46 depicts the shield and center conductor of the coaxial wiring used to provide electrical communication with various components.
Figure 47:
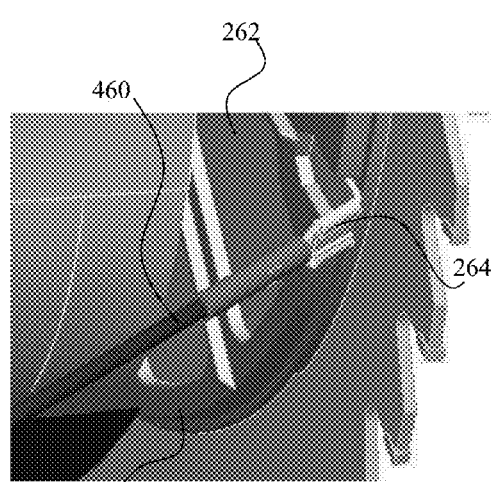
FIG. 47 depicts a perspective view of the connection between the central conductor and the CCP.

As noted above, the positioning of the saw control unit assembly 450 is selected in one embodiment for the convenience of wire routing. Wire routing for one embodiment is depicted in FIG. 45. In FIG. 45, the PCB 452 is connected to the CCP 262 by a coaxial cable 460. The coaxial cable 460, shown in FIG. 46, includes a center conductor 462 which is insulated from a shield 464 by an insulator 466. An outer plastic coat 468 protects and insulates the shield 464. As shown most clearly in FIG. 47, the center conductor 462 of the coaxial cable 460 is connected to the connector tab 264 of the CCP 262 to provide a reliable connection that can withstand the shock loading of the pyrotechnic firing event.

Returning to FIG. 45, the coaxial cable 460 is connected to the height adjust carriage 142 at location 470 and sufficient slack is provided in the wire 460 between the location 470 and the connector tab 264 to allow for the drop arm assembly 194 to move without detaching the coaxial cable 460 from the connector tab 264.

The coaxial cable 460 is further connected to the bevel carriage 134 at locations 472 and 474 and the height adjust carriage 142 at location 476. Sufficient slack is provided in the coaxial cable 460 between the locations 474 and 476 to allow for movement of the height adjust carriage 142 with respect to the bevel carriage 134.

Figure 48:
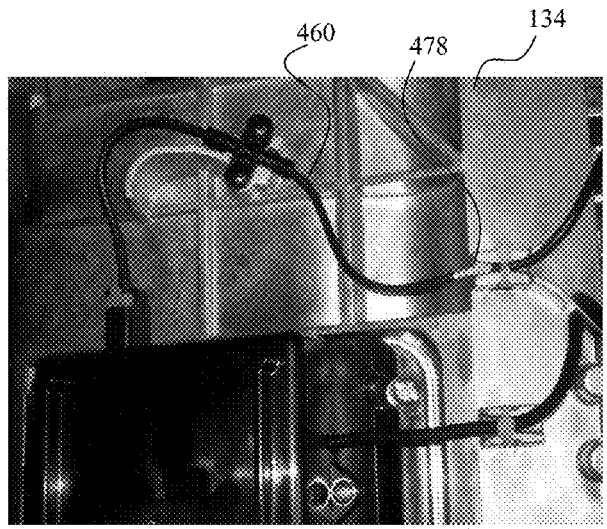
FIG. 48 depicts a perspective view of the coaxial wiring offset from its normal position whereat it is connected to the bevel carriage with the protective covering removed to show the exposed shield which connects to the bevel carriage.
Figure 49:
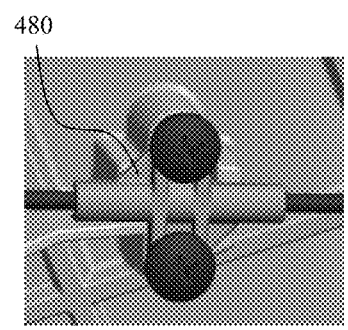
FIGS. 49-50 depict protective coverings used to cover stripped portions of the coaxial wire and also to provide communication between the coaxial wire and other components.

At various locations the outer plastic coat 468 is stripped to expose the shield 464. By way of example, FIG. 48 depicts a stripped area 478 associated with the location 474. The stripped area 478 is placed in direct contact with the bevel carriage 134 at location 474. Typically, a protective covering 480 (see FIG. 49) is then attached over the stripped area 478 to protect the stripped area 478 and to ensure good contact between the shield 464 and the underlying metallic component.

Figure 50:
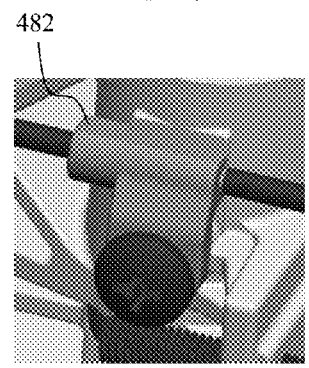

Depending upon the location of the connection, a dual screw protective covering, such as the protective covering 480, or a single screw protective covering such as the protective cover 482 of FIG. 50 may be used. One or more of the protective coverings in some embodiments are formed from a plastic, while in other embodiments one or more of the protective covers are formed from metal to provide increased connectivity. Alternatively, the coaxial cable shield 464 can be soldered directly to other components or surfaces.

In some embodiments, only connection locations provided with a protective cover 480/482 are stripped. Thus, in some embodiments the cable is stripped at the locations 472 and 476 of FIG. 45 but the cable is not stripped at the location 474.

The coaxial cable shield 464 is thus connected to metallic components in such a way that the shield 464 can be connected to multiple points without terminating, and also in such a way as to provide protection to the coax cable 460 where the outer plastic coat 468 is stripped away. This ensures uninterrupted shield connection to all metal parts in the undercarriage assembly. The coaxial cable 460 is thus used to connect shield to the bevel carriage 134, height adjust carriage 142, the riving knife 116 and associated components, etc.

Figure 51:
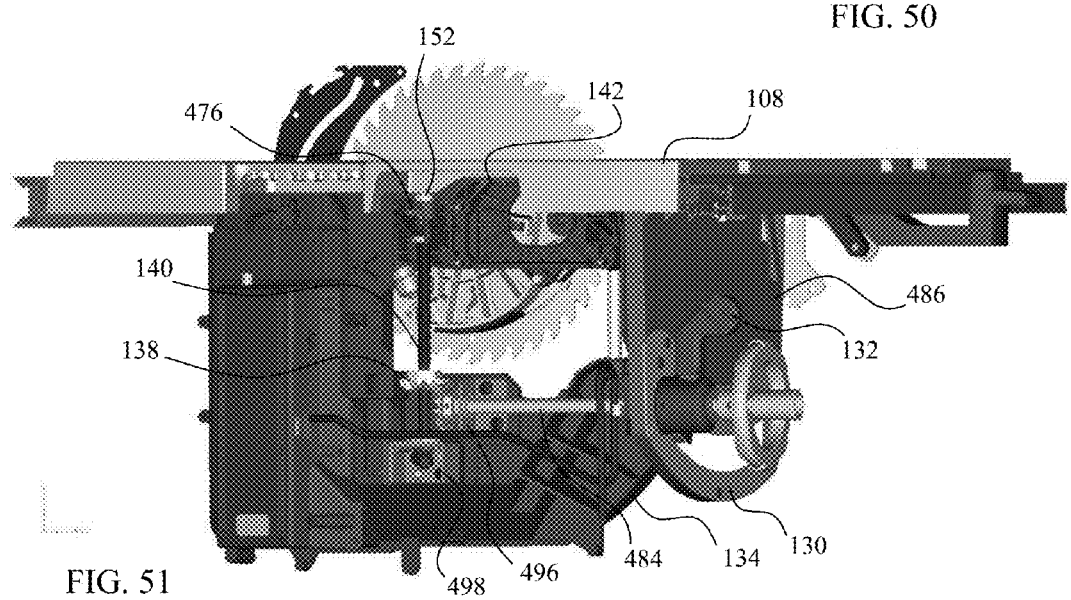
FIG. 51 depicts a side perspective view of the table saw of FIG. 1 with the housing removed to show how components are in communication with the shield of the coaxial wiring.

Shield connection to the angle indicator 130 (FIG. 1) is also provided by the location 472. As discussed above, the location 472 is in electrical communication with the bevel carriage 134, also shown in FIG. 51. The bevel carriage 134 is in turn in electrical communication with a bevel clamp 133. Finally, the bevel clamp 133 is pressed into electrical communication with the angle indicator 130 when the bevel carriage 134 is locked by the bevel adjust lock 132. Thus, the angle indicator 130 is placed in electrical communication with the shield 464.

The angle indicator 130 is electrically isolated from the workpiece support surface 108 by a non-conductive front plate 486. This allows the workpiece support surface 108 to be maintained at "neutral" while the angle indicator 130 is at "shield". In other embodiments electrical isolation is provided by plastic isolators as table connections, by using an all plastic front plate or a plastic front plate with a small insert for bevel clamping, or by using an all metal front plate with non-conductive isolators to the bevel lock and the workpiece support surface. If desired, the workpiece support surface 108 may be connected to earth ground to reduce interference to the sensing system from static electricity. Static electricity from the blade and components connected to shield can be ameliorated by connecting those components to earth ground through a high resistance cable.

Because the bevel carriage 134 is suspended from the workpiece support surface 108, the support mechanisms must also be insulated. As shown in FIG. 52, the bevel carriage 134 includes a pair of beveling trunnions 488 (only one is visible in FIG. 52) which are pivotably supported by a pair of trunnion blocks 490 attached to the workpiece support surface 108. The trunnion blocks 490 are insulated from the beveling trunnions 488 by a pair of plastic trunnion inserts 492.

The angle indicator 130 is connected to shield in some embodiments, either alternatively or additionally, through the bevel carriage 134 or height adjust carriage 142. By way of example, FIG. 45 shows the bevel carriage 134 connected to "shield" at the locations 472 and 476. Electrical communication with the locations 472 and 476 may be provided through a powder metallurgy bracket 496 (see FIG. 51) in electrical communication with the height adjust rod 484 and/or through a threaded rod bracket 498 in electrical communication with the height adjust rod 484. Thus, while the PM brackets 496/498 provide additional strength which allows for other portions of the table saw 102 to be made with lightweight metals, they can also provide for good electrical communication between components.

As noted above, the height adjust carriage 142 is connected to the shield 464. The drop arm frame 242 is in turn in electrical communication with the height adjust carriage 142 through the orbit bracket 203. Accordingly, the arbor shaft 240 and blade 118 are electrically isolated from the drop arm frame 242. As shown in FIG. 53, the arbor shaft 240 is electrically isolated from the drop arm frame 242 by a plastic bearing housing 500 which houses a bearing 501 which supports a blade side 502 of the arbor shaft 240. A pulley side 504 of the arbor shaft 240 is supported by a bearing unit 506. The drop arm frame 242 includes a plastic over-mold 508 which supports a back bearing 510. Accordingly, the blade 118, as well as the arbor shaft 240, arbor nut 336, and blade washers 512/514 are each electrically isolated from the drop arm frame 242. In an alternate embodiment, the bearing 510 is isolated by a component (not shown) wherein the component can be incorporated into the back bearing 510 either by pressed fit, adhesive, over-mold, or other techniques. The bearing can be made from non-conductive material such as ceramic material, as an example.

The arbor shaft 240 is further electrically isolated from the conductive belt 162 (FIG. 15A) by the slave pulley 192. As depicted in FIGS. 53 and 54, the slave pulley 192 includes an inner core 520, an intermediate core 522, and an outer shell 524. A shim 526 is provided between the arbor shaft 240 and an inner shim lip 528 of the motor end pulley 166. In another embodiment, more than one shim may be used in the system. A jam nut 530 maintains the slave pulley 192 on the arbor shaft 240.

The shim 526 provides the correct alignment between the pulley 192 and the pulley 166. The motor end pulley 166 attaches to the motor assembly 160. The driven pulley 192 is attached to the drop arm assembly 194. Because of the tolerance build up, it is possible for the two pulleys 192/166 to be offset. Accordingly, in this embodiment one of the pulleys is fixed and the other is adjustable. While in the embodiment of FIG. 53 a shim is used, in other embodiments the shim is replaced by a sliding collar or a collar that can be adjusted by turning on an external thread. Further embodiments incorporate an adjustable collar, a movable collar with jack screw in the pulley, inclined planes on the pulley and shaft, a c-ring instead of the jam nut, an adjustable multi-piece pulley, or a method using differently sized pulleys based on actual shaft offset measurements.

Returning to FIG. 54, the inner core 520 is wear resistant and may be made from a conductive material. The inner core 520 includes a bore 532 configured to couple with the arbor shaft 240 such as by a threaded engagement. Other methods of engagement such as splined, a keyed, press fit connection, or the like may also be used. The outer shell 524 is also wear resistant and may be made from a conductive material. The outer shell 524 includes an outer surface 534 configured to engage the belt 162.

The intermediate core 522 is formed from a non-conductive material which in one embodiment is an insert molded plastic. The outer surface 536 of the inner core 520 and the inner surface 538 of the outer shell 524 include features to prevent slipping of the intermediate core 522 with respect to the inner core 520 or the outer shell 524. The features include, but are not limited to, knurl, splined, dove-tail, protruded structure, anti-slip structure, locking structure, or the like.

As depicted in FIG. 54A, the outer shell 524 in this embodiment includes splines 540 which are dovetailed. The outer faces exhibit an angle 542 of about 6°. This provides increased locking which is beneficial when materials exhibiting different thermal expansion and contraction characteristics are used. Accordingly, when the intermediate core 522 is formed, complementary dovetail structures are formed in the intermediate shell as depicted in FIG. 54. Thus, the outer component and the inner component of the pulley define a plurality of dovetail connections therebetween.

In other embodiments, electrical isolation between the arbor shaft 240 and the belt 162 is provided using an all plastic pulley, an anodized aluminum pulley, or a plastic over-mold pulley.

In some embodiments, a non-conductive belt is used in place of the conductive belt 162. In this embodiment, a conductive pulley can be used with the non-conductive belt. In another embodiment, a conductive belt can be used with one conductive pulley and one non-conductive pulley.

The motor assembly 160 shown in FIG. 6 is thus isolated from the arbor shaft 240 by the slave pulley 192. As depicted in FIG. 6, the motor assembly 160 is further isolated by the motor end pulley 166 which is made like the slave pulley 192 with a non-conductive intermediate core 580 between an inner core 582 and an outer shell 584.

While the motor assembly 160 is thus electrically isolated from the arbor shaft 240 and blade 118, the motor is nonetheless capable of generating electromagnetic interference. Accordingly, the motor assembly 160 is configured to reduce the potential transmission of interfering electromagnetic energy. As depicted in FIG. 6, the power shaft 168 is radially supported within a casing 586 by a bearing 588. The other end of the power shaft 168 is radially supported within the motor gear housing 176 by a bearing 590. The offset drive shaft 164, containing the gear 170, is radially supported within the motor gear housing 176 by a bearing 592. A bearing 594 is supported by a cover plate 596. The cover plate 596 is attached to the motor gear housing 176 and encloses the gear 170 and positions the gear 170 to be driven by an armature pinion.

If all of the foregoing components were made from metals, the motor assembly 160 would act like an antenna and transmit noise which could interfere with the sensing system. Specifically, the offset drive shaft 164 (also called a gear shaft) and the bearings 588, 590, 592, and 594 all transmit noise which if coupled to a large component like the motor gear housing 176, the motor casing 586, or the cover plate 596 would be transmitted in the vicinity of the sensing system if those components were made from metal. In order to reduce interference with the sensing system, the motor gear housing 176, the casing 586, and the cover plate 596 are therefore made from plastic, significantly reducing the noise transmitted by the motor assembly 160. In alternative embodiments, a non-metallic barrier is positioned between the shafts/bearings and the cover plate/gear housing.

In addition to interference from electrical noise, the motor assembly 160 also generates carbon dust which can interfere with the operation of the sensing system including the CCP 262. For example, carbon dust from universal motor brushes can build up on components and may form a conductive path that will affect the sensing system. Accordingly, unlike typical motor housings, the motor gear housing 176 is provided with a number of radial air vents 610 as shown in FIG. 55. The radial air vents 610 divert cooling air which is axially driven by a fan 612 (see FIG. 6) and divert the air radially. Accordingly, any carbon entrained within the fan driven air is forced in a direction away from electrically isolated components including the CCP 262 thereby reducing the possibility of carbon dust buildup between the isolated components.

In some embodiments, additional reductions in electrical noise interference are realized by incorporating an electronically commutated motor rather than an AC universal motor. An electronically commutated motor provides a more consistent noise level which is more easily mitigated and may reduce generated noise. Other noise reducing features include the incorporation of ceramic bearings instead of plastic bearing isolators, isolation of gear to pulley shaft with thermoset or thermoplastic, isolating the blade locally such as by using non-conductive blade washers, incorporation of non-conductive couplers on shaft, incorporating a partly non-conductive arbor shaft, or using an aluminum gear housing with isolated bearings.

The fence 114 of FIG. 1 is also configured to reduce potential interference with the sensing system. Specifically, the fence 114 is removably and movably attached to rails 620/622 which are mounted to the workpiece support surface 108. The fence 114 is optionally in electrical communication with the workpiece support surface 108. Because the fence 114 is movable, it is possible for the fence to come into contact with the blade 118 or the riving knife 116 (or associated pawls). To reduce the potential for inadvertent contact which could affect the sensing system, the sides and top of the body portion of the fence 114 are formed with isolating components 624, 626, 628, respectively. This allows for internal components and end portions of the fence 114 to be formed from metal.

In one embodiment, one or more of the isolating components 624, 626, 628 can be removed and reinstalled by the user to allow use of custom made jigs or fixtures with the tool. In another embodiment, a single isolating component is used. The one isolating component may be "U" shaped to cover all three surfaces or simply cover one side of the fence.

In further embodiments, the body portion of the fence is over-molded with an isolation material. In some embodiments the riving knife and associated pawls are isolated from the shield signal or formed from non-conductive materials. In some embodiments, the isolating component 628 is omitted and kickback pawls are provided with a "lock-up" feature similar to those common with the overhead guard which lock up to prevent contact with the top of the fence. In further embodiments the isolating component 628 is omitted and the fence is configured to extend only across the workpiece support surface 108 to a location at which it cannot contact the kickback pawls.

The throat plate 122 of FIG. 1 is also configured to reduce electrical interference as explained with reference to FIG. 56. The throat plate 122 includes an insert receiving area 640 in which an insert 642 is mounted. The throat plate 122 is configured to fit within the throat plate opening 334 in the upper surface of the workpiece support surface 108. The throat plate 122 is removably mounted to the workpiece support surface 108 by first inserting two tabs 646/648 within slots (not shown) in the workpiece support surface 108 or under a lip (not shown) of the workpiece support surface 108. A knob 650 is then rotated to lock the throat plate 122 in place.

The knob 650 has a body portion 652 and a stem 654. The body portion 652 is rotatably positioned in a knob well 656 in the workpiece support surface 108. The stem 654 extends through a hole (not shown) in the knob well 656 to the underside of the workpiece support surface 108. A spring assembly 658 is positioned on the stem 654 (see FIG. 57) beneath the workpiece support surface 108 biasing the body portion 652 against the bottom of the knob well 656.

Turning to FIG. 58, the body portion 652 of the knob 650 includes two finger holes 660, a locking cam 662 and a lifting cam 664. The finger holes 660 provide an area for a user to gain leverage so as to rotate the knob 650. In other embodiments, other geometry is provided to allow a user to gain leverage. In some embodiments, the body portion includes a coupling feature which allows a tool such as a screw driver, Allen wrench, or other tool to engage the knob 650 when rotation of the knob 650 is desired.

The cams 662 and 664 selectively engage a cam ramp 666 located in a knob recess 668 of the throat plate 122 shown in FIG. 59. By rotation of the knob 650 in a clockwise direction, the lifting cam 664 is rotated beneath the cam ramp 666 forcing the throat plate 122 upwardly so as to allow a user to more easily grip and remove the throat plate 122. Rotation of the knob 650 in a counter clockwise rotates the locking cam 662 over the top of the cam ramp 666 thereby locking the throat plate in position.

The knob 650 and the throat plate 122 in one embodiment are made of plastic to preclude interference with the sensing system. In areas which are subject to increased wear, metal inserts such as the insert 642 may be used to provide increase wear resistance. Such metal inserts are insulated from the workpiece support surface 108 by the plastic throat plate 122.

Removal of the throat plate 122 is typically desired in order to facilitate changing of the blade 118 or other shaping device. Accordingly, a user simply rotates the knob 650 in a clockwise direction to force the throat plate 122 upwardly as described above and then removes the throat plate to expose the arbor nut 336 as depicted in FIG. 21. Because the drop arm assembly 194 is supported solely by the latch 300 (see FIG. 29), it may be possible for the user to dislodge the drop arm assembly 194 inadvertently while loosening or tightening the arbor nut 336. For example, when a blade wrench is used to turn the arbor nut in the tightening direction, a moment is generated which acts on the drop arm orbiter 272 in a direction that acts against the supporting force of the latch spring 308 and can cause de-latching. The arbor lock 250 is used to preclude such de-latching as described below.

With reference to FIG. 15B, once the throat plate 122 is removed, a user pushes the activation arm 252 in the direction of the arrow 670. Referring now to FIG. 21, as the activation arm 252 is pushed in the direction of the arrow 670 of FIG. 15B, the flange 248 compresses the spring 246 and the arbor lock 250 is forced in the direction of the arrow 672. The arbor lock 250 thus slides along the shoulder screws 258 and the arbor shaft 240 by way of the guide slots 260 guided by the shoulder screws 258 and the arbor slot 256.

As the arbor lock 250 moves to the left as depicted in FIG. 15B, a narrow portion 674 of the arbor slot 256 moves into a notch 676 in the arbor shaft 240 locking the arbor shaft which allows a user to rotate the arbor nut 336 (see FIG. 21).

Figure 60:
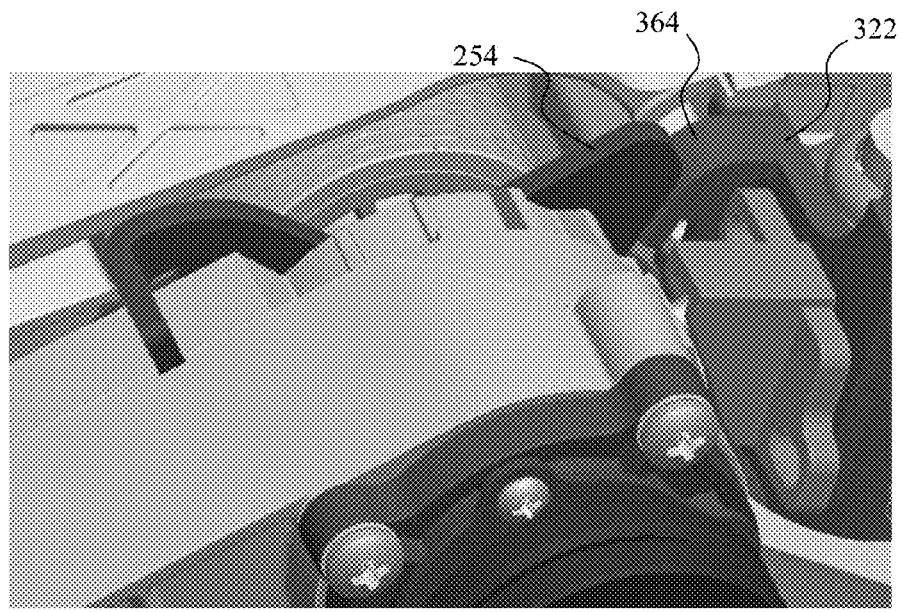
FIG. 60 depicts a partial perspective view of the drop arm assembly with the arbor lock of FIG. 15B engaging the pyrotechnic housing to maintain the drop arm assembly in a latched condition.

Additionally, the locking ramp 254 is positioned onto the locking ramp 364 as depicted in FIG. 60. Since the locking ramp 364 is a part of the pyrotechnic housing 332 which is mounted to the height adjust carriage 142, the drop arm assembly 194 cannot be de-latched from the latch 300 even while tightening the arbor nut 336. In alternate embodiments the arbor lock interfaces with other components attached to or a part of the height adjust carriage 142.

Figure 61:
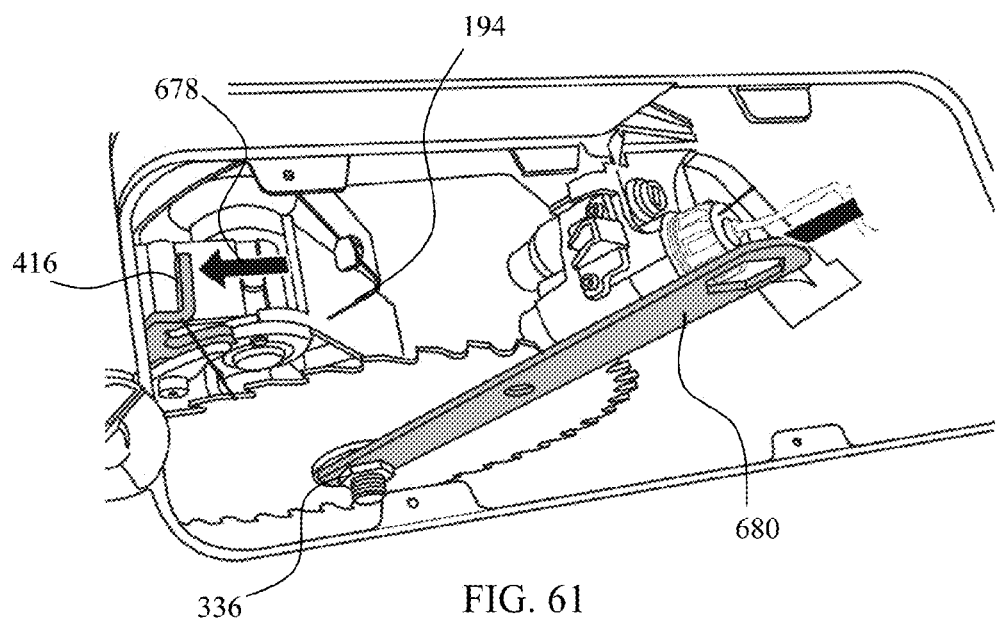
FIG. 61 depicts a partial top perspective view of the table saw of FIG. 1 with the throat plate removed to allow resetting of the drop arm assembly.

Removal of the throat plate 122 further allows the user to reset the drop arm assembly 194 in the event of de-latching of the drop arm assembly 194 from the latch 300 either as a result of the saw control unit or other de-latching. As shown in FIG. 61, the drop arm assembly 194 may be reset by first pushing the reset lever 416 in the direction of the arrow 678 which moves the upper latch 404 and the lower latch 402, as described above with respect to FIG. 36, allowing the drop arm assembly 194 to be orbited upwardly. The user then positions a blade wrench 680 about the arbor nut 336 or the arbor shaft 240 to pull the drop arm assembly 194 back into a latched position as described above with respect to FIGS. 26-29.

In some embodiments, a push stick or some other removable tool are used to raise the drop arm assembly 194. In further embodiments, a hand hold is provided on the drop arm assembly itself. In still other embodiments, the drop arm assembly 194 is automatically raised such as by using energy stored during movement of the drop arm assembly 194 after de-latching. In some of the embodiments, some of the energy from movement of the drop arm assembly is stored in a spring positioned at the surface 374.

The HMI unit 124 of FIG. 1 is shown in greater detail in FIG. 62. The HMI unit 124 includes a housing 700, an access point 702, a near field communication (NFC) access point is illustrated herein, and a number of status indicators 704. Other types of communication protocol such as Bluetooth, zigbee, Wi-Fi, data protocol, mobile protocol, ultra wide band (UWB) protocol, or any frequency band are possible. The housing 700 protects the other components of the HMI unit 124 while providing user access to components of the HMI unit 124. The NFC access point 702 is a location at which an electronic device such as a smart phone can be positioned in order to transfer data from a transceiver of the HMI unit 124 to the smart phone. To this end, a user smart phone is provided with an application which includes communication protocols. A user can use the NFC access point 702 to obtain current status of the table saw 102 as well as unique identification information for the table saw. The application can then be used to obtain maintenance recommendations, reset procedures or trouble-shooting procedures, and to provide registration of the table saw. The application can further lock or unlock the system. For example, the application is used to lock or unlock one or more of the bypass switch and the motor power switch using a personal identification number or code.

The status indicators 704 are used to provide desired alerts or status indicators to a user. In some embodiments, the status indicators 704 indicate power available, safety system in bypass, safety or system error which is correctable by the user, and safety or system error which is correctable by a service center. In different embodiments, more or fewer status indicators 704 are provided. The construction of the HMI unit 124 enables viewing of the status indicators 704 even in bright sunlight as discussed with further reference to FIG. 63.

As shown in FIG. 63, the status indicators 704 are illuminated by four LEDs 706 on a printed circuit board (PCB) 708. In some embodiments, the LEDS 706 are each provided as a colored LED having a color different from the other of the LEDSs. An NFC antenna 710 is also provided on the PCB 708. The PCB 708 is supported by a support 712 which is attached to the housing 700. A spacer 714 is attached to the support 712 by a number of clips 716. The spacer 714 includes a number of wells 718 which include openings (not shown) at a lower portion of the wells 718 which receive a respective one of the LEDs 706. The spacer 714 provides the proper spacing between LEDs and a diffuser 720, as well as the proper spacing between the NFC antenna 710 and the smartphone access point 702. The wells 718 of the spacer 714 also prevent light bleed between the different colored LEDs 706. The wells 718 of the spacer 714 further include one or more openings or passageways 719. The passageways channel dust away from the LEDs 706 thereby preventing the LEDs 706 from being covered.

The diffuser 720 includes a number of lenses 722, each lens associated with a respective one of the wells 718. The diffuser 720 retains LED brightness while diffusing light to look uniform across the exposed surface. The diffuser 720 is made of material that is scratch and shatter resistant.

While some components of the table saw 102 are thus configured to provide ease of access or use, access or use of some components by a user is not desired. By way of example, the PCB 452 must be electronically accessible during assembly of the table saw 102 and in some instances by a service technician, but should not be accessed by a user. Accordingly, the USB port 458 is positioned to provide access to a technician while limiting access to a user as discussed with initial reference to FIG. 64.

In FIG. 64, the table saw 102 is depicted with a zero bevel angle. Accordingly, a dust port 730 is positioned adjacent to a lower end portion of a dust port access slot 732 in the base housing 106. The dust port 730 is part of a dust shroud 734 which is attached to the bevel carriage 134 (not visible in FIG. 64). In this position, neither the outer housing 454 nor the USB port 458 of FIG. 42 are visible to a user.

FIG. 65 depicts a rear view of the table saw 103 when the table saw 102 is positioned at a forty-five degree bevel angle (the dust shroud 734 is not depicted in this view). At this position, the outer housing 454 and the USB port 458 are viewable through the dust port access slot 732. Accordingly, the USB port 458 is accessible by a service technician. Since a user is not expected to frequently look through the dust port access slot 732 at the angle depicted in FIG. 65, however, a user will generally not see the USB port 458. Accordingly, the USB port 458 is shielded from the user under most scenarios.

In some embodiments, access to the USB port 458 is further protected such as by providing a protective plastic or rubber plug 736 (FIG. 66) or a cover 738 screwed down with tamper resistant screw 740 (FIG. 67). In some embodiments, the outer housing 454 must be removed to provide access to the PCB 452.

While the disclosure has been illustrated and described in detail in the drawings and foregoing description, the same should be considered as illustrative and not restrictive in character. It is understood that only the preferred embodiments have been presented and that all changes, modifications and further applications that come within the spirit of the disclosure are desired to be protected.

The invention claimed is:

1. A power tool assembly, comprising:
a workpiece support surface;
a drop arm assembly including a drop arm frame and an arbor shaft configured to support a shaping device at least partially above the workpiece support surface, the drop arm assembly configured to move within a drop plane to drop the shaping device completely beneath the workpiece support surface;
a belt operably connected to the arbor shaft and configured to rotate the arbor shaft through a slave pulley, the slave pulley having a slave pulley axis of rotation;
a motor including a power shaft operably connected to the belt through a motor end pulley, the motor end pulley having a motor end pulley axis of rotation; and
an orbit bracket configured to orbitally support the drop arm assembly, the orbit bracket defining a drop arm orbit axis located between the motor end pulley axis of rotation and the slave pulley axis of rotation.

2. The power tool assembly of claim 1, wherein the drop arm orbit axis is lower than the motor end pulley axis of rotation.

3. The power tool assembly of claim 2, wherein the orbit bracket is fixedly attached to a height adjust carriage.

4. The power tool assembly of claim 3, wherein:
the height adjust carriage includes a locator pin and an anti-rotation pin;
the orbit bracket includes an alignment bore defining a bore axis and configured to receive the locator pin, and an anti-rotation slot extending lengthwise along a slot axis and configured to receive the anti-rotation pin; and
the slot axis is aligned to intersect the bore axis.

5. The power tool assembly of claim 4, wherein:
the orbit bracket includes an inner face portion configured to contact the height adjust carriage; and
the inner face defines a non-zero angle with respect to a plane parallel to the drop plane.

6. The power tool assembly of claim 5, wherein:
the inner face defines an angle of about 0.65° with respect to a plane parallel to the drop plane.

7. The power tool assembly of claim 5, wherein:
the orbit bracket includes an orbit shaft hole through which an orbit shaft is inserted;
the drop arm frame is orbitally supported by the orbit bracket though the orbit shaft; and
the orbit shaft hole includes a lower portion and an upper portion, the lower portion and the upper portion configured to form two shoulders extending within the orbit shaft hole along an axis defined by the orbit shaft hole.

8. The power tool assembly of claim 7, wherein:
the lower portion is a lower circular portion having a first origin;
the upper portion is an upper circular portion having a second origin; and
the second origin is offset from the first origin.

9. The power tool assembly of claim 7, wherein:
the lower portion is a lower circular portion having a first diameter size;
the upper portion is an upper circular portion having a second diameter size; and
the second diameter size is different from the first diameter size.

10. The power tool assembly of claim 7, further comprising:
at least two set screws, each of the at least two set screws configured to force the orbit shaft against the two shoulders.

11. The power tool assembly of claim 10, wherein:
the orbit bracket further includes a pair of aligned bores opening to the orbit shaft hole;
the orbit shaft includes an orbit shaft bore passing therethrough and aligned with the pair of aligned bores; and
the power tool assembly further includes an orbit pin extending through the pair of aligned bores and the orbit shaft bore.

12. A method of connecting a drop arm assembly of a power tool assembly, the drop arm assembly including a drop arm frame and an arbor shaft configured to support a shaping device at least partially above a workpiece support surface, the drop arm assembly configured to move within a drop plane to drop the shaping device completely beneath the workpiece support surface, comprising:
defining a slave pulley axis of rotation for a slave pulley configured to be rotated by a belt;
defining a motor end pulley axis of rotation for a motor end pulley configured to be operably connected to a power shaft of a motor, and configured to be operably connected to the belt; and
defining a drop arm orbit axis located between the motor end pulley axis of rotation and the slave pulley axis of rotation with an orbit bracket configured to orbitally support the drop arm assembly.

13. The method of claim 12, wherein defining the drop arm orbit axis comprises defining a drop arm orbit axis that is lower than the motor end pulley axis of rotation.

14. The method of claim 13, wherein defining the drop arm orbit axis comprises fixedly attaching the orbit bracket to a height adjust carriage.

15. The method of claim 14, wherein fixedly attaching the orbit bracket to a height adjust carriage comprises:
inserting a locator pin of the height adjust carriage into an alignment bore of the orbit bracket, the alignment bore defining a bore axis; and
inserting an anti-rotation pin of the height adjust carriage into an anti-rotation slot of the orbit bracket, the anti-rotation slot including a slot axis extending lengthwise along the slot, the slot axis aligned to intersect the bore axis.

16. The method of claim 15, wherein fixedly attaching the orbit bracket to the height adjust carriage comprises:
positioning an inner face portion of the orbit bracket against the height adjust carriage, the inner face defining a non-zero angle with respect to a plane parallel to the drop plane.

17. The method of claim 15, wherein defining the drop arm orbit axis comprises:
inserting an orbit shaft within an orbit shaft hole of the orbit bracket; and
contacting two shoulders, extending along an axis defined by the orbit shaft hole and defined by a lower portion and an upper portion of the orbit shaft hole, with the inserted orbit shaft.

18. The method of claim 15, wherein defining the drop arm orbit axis comprises:

forcing the orbit shaft against the two shoulders with at least two set screws.

19. The method of claim 18, further comprising:

aligning an orbit shaft bore with a pair of aligned bores opening to the orbit shaft hole; and positioning an orbit pin through the pair of aligned bores and the aligned orbit shaft bore.

20. The method of claim 19, further comprising:

compressing a pair of bearings against respective inner bearing walls of spaced apart brackets of the drop arm frame using the orbit shaft.

* * * * *